(12) United States Patent
Takahashi et al.

(10) Patent No.: US 8,336,303 B2
(45) Date of Patent: Dec. 25, 2012

(54) MULTI-CYLINDER INTERNAL COMBUSTION ENGINE, VEHICLE, MARINE VESSEL, AND EXHAUSTING METHOD FOR MULTI-CYLINDER INTERNAL COMBUSTION ENGINE

(75) Inventors: Yusuke Takahashi, Shizuoka (JP); Tsugunori Konakawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 365 days.

(21) Appl. No.: 12/669,811

(22) PCT Filed: Jun. 15, 2009

(86) PCT No.: PCT/JP2009/060856
§ 371 (c)(1),
(2), (4) Date: Jan. 20, 2010

(87) PCT Pub. No.: WO2009/151138
PCT Pub. Date: Dec. 17, 2009

(65) Prior Publication Data
US 2010/0192557 A1  Aug. 5, 2010

(30) Foreign Application Priority Data

Jun. 13, 2008 (JP) ................. 2008-155070
Jul. 22, 2008 (JP) ................. 2008-188428

(51) Int. Cl.
*F01N 1/02* (2006.01)
*F01N 1/08* (2006.01)
*F01N 3/00* (2006.01)
*F01B 27/02* (2006.01)

(52) U.S. Cl. ............... 60/313; 60/312; 60/323; 60/305

(58) Field of Classification Search ............. 60/311–314
See application file for complete search history.

(56) References Cited

U.S. PATENT DOCUMENTS 2,118,209 A * 5/1938 Linthwaite ............. 440/78
(Continued)

FOREIGN PATENT DOCUMENTS

GB        319 426 A    9/1929
(Continued)

OTHER PUBLICATIONS

A.Graham Bell, Four-Stroke Performance Tuning, Feb. 1981, p. 158-161,165,166,168,172.*

(Continued)

*Primary Examiner* — Thomas Denion
*Assistant Examiner* — Anthony Ayala Delgado
(74) *Attorney, Agent, or Firm* — Keating & Bennett, LLP

(57) ABSTRACT

A multi-cylinder internal combustion engine capable of decreasing the pressure or temperature of exhaust gas. The internal combustion engine includes at least two cylinders and an exhaust path. The exhaust path includes a convergent-divergent nozzle and an exhaust merging section provided upstream with respect to an upstream end of the divergent section arranged to connect only exhaust ports of combustion chambers for which the opening periods do not overlap. A shock wave propagating in a merging upstream section is branched at a connection section, and the branched shock wave is reflected by an exhaust valve of cylinder and collides against the exhaust gas. In accompaniment with the passage of the exhaust gas having the pressure increased by the shock wave through the convergent-divergent nozzle, a new shock wave propagating in a downstream direction in the exhaust path is generated and also an expansion wave propagating in an upstream direction in the exhaust path is generated. Thus, the temperature and pressure of the exhaust gas are significantly decreased.

14 Claims, 20 Drawing Sheets

U.S. PATENT DOCUMENTS

| | | | | |
|---|---|---|---|---|
| 3,180,077 A | * | 4/1965 | Berchtold | 60/313 |
| 3,453,824 A | * | 7/1969 | Biesecker | 60/313 |
| 3,491,534 A | * | 1/1970 | Garner | 60/313 |
| 3,653,212 A | * | 4/1972 | Gast et al. | 60/293 |
| 3,797,241 A | * | 3/1974 | Kern | 60/305 |
| 4,116,172 A | * | 9/1978 | Lohr et al. | 123/54.7 |
| 4,660,378 A | | 4/1987 | Scharpf | |
| 4,835,965 A | * | 6/1989 | Poehlman | 60/313 |
| 5,216,883 A | | 6/1993 | Flugger | |
| 5,768,891 A | * | 6/1998 | Wagner | 60/313 |
| 2008/0022671 A1 | | 1/2008 | Konakawa et al. | |

FOREIGN PATENT DOCUMENTS

| | | |
|---|---|---|
| GB | 522 861 A | 6/1940 |
| JP | 61-155620 A | 7/1986 |
| JP | 61-212629 A | 9/1986 |
| JP | 62-58017 A | 3/1987 |
| JP | 01-76520 U | 5/1989 |
| JP | 2-81928 A | 3/1990 |
| JP | 2004-150310 A | 5/2004 |
| JP | 2008-031868 A | 2/2008 |
| JP | 2008-031925 A | 2/2008 |

OTHER PUBLICATIONS

A.S. Rangwala, Reciprocating Machinery Dynamics, 2006, New Age international (p)Ltd. Publisher, p. 420-425,427 and 428.*

English Tanslation of JP 01076520U by Tadakazu Shiozaki.*

JP01076520U, English Translation, Shiozaki, Tadakazu, Pub Date: May 24 1989, Exhaust Device for Engine—Translation done on Feb. 2012.*

Official Communication issued in corresponding European Patent Application No. 09 75 6232, completed on Jun. 10, 2011.

Official Communication issued in International Patent Application No. PCT/JP2009/060856, mailed on Sep. 15, 2009.

Takahashi et al.; "Internal Combustion Engine, Vehicle, Marine Vessel, and Exhausting Method for Internal Combustion Engine"; U.S. Appl. No. 12/669,808, filed Jan. 20, 2010.

Takahashi et al.; "Internal Combustion Engine, Vehicle, Marine Vessel, and Secondary Air Supply Method for Internal Combustion Engine"; U.S. Appl. No. 12/669,809, filed Jan. 20, 2010.

Takahashi et al.; "Nternal Combustion Engine, Vehicle, Marine Vessel, and Exhaust Gas Cleaning Method for Internal Combustion Engine"; U.S. Appl. No. 12/669,810, filed Jan. 20, 2010.

* cited by examiner

MULTI-CYLINDER INTERNAL COMBUSTION ENGINE, VEHICLE, MARINE VESSEL, AND EXHAUSTING METHOD FOR MULTI-CYLINDER INTERNAL COMBUSTION ENGINE

BACKGROUND OF THE INVENTION

1. Field of the Invention

The present invention relates to a multi-cylinder internal combustion engine, a vehicle, a marine vessel, and an exhausting method for a multi-cylinder internal combustion engine.

2. Description of the Related Art

Conventionally, in order to enhance the performance of internal combustion engines, gas exhaust devices of the internal combustion engines have been improved. For example, as described in Japanese Laid-Open Utility Model Publication No. 1-76520, an internal combustion engine including a convergent-divergent nozzle (generally called a "de Laval nozzle") has been proposed in order to enhance the scavenging efficiency. The nozzle includes a convergent section including a flow path cross-sectional area which is decreased as a fluid progresses, a divergent section provided downstream with respect to the convergent section and including a flow path cross-sectional area which increases as the fluid progresses, and a throat section provided between the convergent section and the divergent section. When the pressure ratio of the pressure P0 in the convergent section and the pressure P in the divergent section (i.e., P/P0) is smaller than the critical pressure ratio (for the air, about 0.528), the velocity of the fluid exceeds the sonic velocity in the divergent section. Japanese Laid-Open Utility Model Publication No. 1-76520 has an object of improving the scavenging efficiency using this function of this nozzle. Specifically, as shown in FIG. 1 of Japanese Laid-Open Utility Model Publication No. 1-76520, six exhaust ports of the inline six-cylinder internal combustion engine are merged into a merging exhaust pipe. In addition, the exhaust path thereof is set to have such a length that increases the scavenging efficiency, and the nozzle is provided at the exhaust outlet of the merging exhaust pipe. Japanese Laid-Open Utility Model Publication No. 1-76520 describes that the exhaust gas flow, which has passed the nozzle and thus is increased in velocity, absorbs the exhaust gas remaining in the merging exhaust pipe, and thus the scavenging efficiency can be improved.

SUMMARY OF THE INVENTION

The present inventors have studied internal combustion engines using the function of a convergent-divergent nozzle as described in Japanese Laid-Open Utility Model Publication No. 1-76520. While studying the internal combustion engines, the present inventors discovered that when the velocity of exhaust gas is increased to the sonic velocity to generate a shock wave, the pressure in a region upstream with respect to the shock wave is decreased. The present inventors conceived of a novel concept of enhancing the performance of an internal combustion engine by generating a negative pressure in the exhaust path using such a decrease of the pressure in the region upstream with respect to the shock wave. However, as a result of actively studying Japanese Laid-Open Utility Model Publication No. 1-76520, the present inventors discovered that even if the velocity of the exhaust gas becomes high due to the action of the convergent-divergent nozzle, a negative pressure cannot be generated in a portion of the merging exhaust pipe which is upstream with respect to the nozzle for the following reasons. The internal combustion engine described in Japanese Laid-Open Utility Model Publication No. 1-76520 is a six-cylinder internal combustion engine and explodes every 120 degrees of the crank angle. Therefore, a pressure wave is generated in the exhaust path at an interval of 120 degrees. In general, the angle at which the exhaust port of an internal combustion engine is opened (work angle) is about 240 degrees. In the internal combustion engine described in Japanese Laid-Open Utility Model Publication No. 1-76520, the ports of the cylinders are merged into one convergent-divergent nozzle at a position upstream with respect thereto. Therefore, while the exhaust port of one cylinder is opened, the exhaust port of at least one of the remaining cylinders is opened. Before the exhaust port of one cylinder is closed, the exhaust port of the cylinder in which the next explosion is to occur is opened and the next pressure wave is generated. For this reason, the inside of the merging exhaust pipe is always in a positive pressure state. Even if the pressure ratio of the pressure P0 in the convergent section and the pressure P in the divergent section (i.e., P/P0) is decreased to be lower than the critical pressure ratio and the velocity of the exhaust gas exceeds the sonic velocity in the divergent section, the inside of the merging exhaust pipe always stays in the positive pressure state. As a result, the performance of the internal combustion engine cannot be expected to be fully improved.

In light of such circumstances, preferred embodiments of the present invention provide a novel multi-cylinder internal combustion engine including exhaust ports of a plurality of cylinders connected to one another, which offers improved performance by applying the principle of the convergent-divergent nozzle.

A multi-cylinder internal combustion engine according to a preferred embodiment of the present invention includes a plurality of combustion chambers each including at least one exhaust port; a plurality of exhaust valves each arranged to open or close the exhaust port; and an exhaust path arranged to guide exhaust gas discharged from each of the combustion chambers via the exhaust port. The exhaust path includes a convergent section including a flow path cross-sectional area that is smaller at a downstream end thereof than at an upstream end thereof; a divergent section provided downstream with respect to the convergent section and having a flow path cross-sectional area that is larger at a downstream end thereof than at an upstream end thereof; and an exhaust merging section provided upstream with respect to the divergent section arranged to connect a plurality of combustion chambers, opening periods of the exhaust ports of which do not overlap, without connecting a plurality of combustion chambers, opening periods of the exhaust ports of which overlap. A shock wave, propagating in the exhaust merging section at a higher velocity than the exhaust gas flowing into the exhaust merging section when one of the plurality of exhaust ports connected by the exhaust merging section is opened, is reflected by the exhaust valve closing another one of the plurality of exhaust ports. The exhaust gas flowing into the exhaust path from the combustion chamber is caused to pass the convergent section and to collide against the reflected shock wave, between an upstream end of the exhaust merging section and the divergent section, so as to increase the pressure of the exhaust gas in the convergent section. The exhaust gas is caused to pass the divergent section to generate a new shock wave and thus to generate a negative pressure in a portion of the exhaust path which is upstream with respect to the divergent section by the generated new shock wave.

According to a preferred embodiment of the present invention, an exhaust merging section is provided upstream with respect to the divergent section, which connects exhaust ports of a plurality of combustion chambers, opening periods of which do not overlap, without connecting a plurality of combustion chambers, opening periods of the exhaust ports of which overlap. As a result of this structure, a positive pressure and a negative pressure are alternately generated in a portion of the exhaust path which is upstream with respect to the divergent section. A shock wave, propagating in the merging section at a higher velocity than the exhaust gas flowing into the merging section when one of a plurality of exhaust ports connected by the merging section is opened, is reflected by an exhaust valve closing an exhaust port, and the reflected shock wave is caused to collide against the exhaust gas upstream with respect to the divergent section. Therefore, the pressure of the exhaust gas is increased. Since the exhaust gas is caused to pass the convergent section, the pressure of the exhaust gas is increased. Since such exhaust gas is caused to pass the divergent section, a new shock wave propagating in a downstream direction is generated. Thus, a positive pressure and a negative pressure are alternately generated in a portion of the exhaust path which is upstream with respect to the divergent section, and the pressure in a portion upstream with respect to the new shock wave is decreased. As a result, a large negative pressure is generated in a portion of the exhaust path which is upstream with respect to the divergent section, and thus the performance of the internal combustion engine can be improved.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 7A-7C are schematic views of an exhaust device showing the progress of a shock wave and exhaust gas; wherein FIG. 7A shows an initial state of an exhaust stroke, FIG. 7B shows a state where the shock wave propagates to a branch path, and FIG. 7C shows a state where the shock wave reflected by the branch path collides against the exhaust gas.

FIGS. 13A and 13B are P-V diagrams representing the pumping loss; wherein FIG. 13A shows a P-V diagram of a conventional internal combustion engine, and FIG. 13B shows a P-V diagram of an internal combustion engine according to a preferred embodiment of the present invention.

DETAILED DESCRIPTION OF THE PREFERRED EMBODIMENTS

As a result of active studies, the present inventors conceived of an idea that a large negative pressure can be generated in the exhaust path by applying the principle of the convergent-divergent nozzle and using the following method not conventionally known. The present inventors discovered that this idea can improve the performances of a multi-cylinder internal combustion engine.

The method is as follows. (1) A shock wave preceding the exhaust gas discharged from an exhaust port to the exhaust path is branched; (2) The branched shock wave is reflected by an exhaust valve closing an exhaust port which is different from the exhaust port from which the exhaust gas has been discharged; (3) The reflected shock wave is caused to collide against the exhaust gas to increase the pressure of the exhaust gas; (4) The exhaust gas having the increased pressure is caused to pass the divergent section to be accelerated to an ultrasonic velocity, thereby generating a shock wave; and (5) A negative pressure is generated in a portion of the exhaust path which is upstream with respect to the divergent section.

Preferred Embodiment 1

Figure 1:
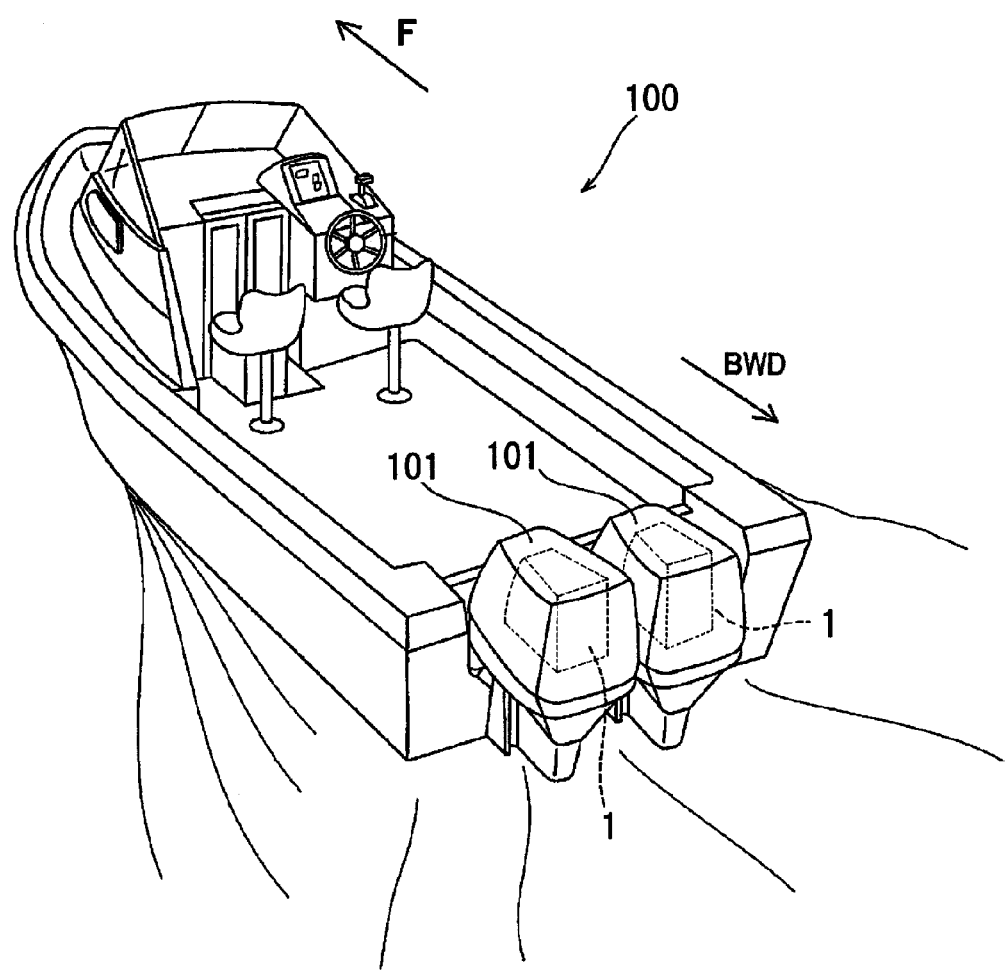
FIG. 1 shows a marine vessel including an internal combustion engine according to a preferred embodiment of the present invention mounted thereon.

Hereinafter, an internal combustion engine according to a preferred embodiment of the present invention will be described in detail with reference to the drawings. An internal combustion engine according to the preferred embodiment shown in FIG. 1 is preferably an inline four-cycle four-cylinder internal combustion engine, for example, for an outboard motor 101 attached to a marine vessel 100, for example.

In the figure, arrow F represents a forward direction with respect to the outboard motor 101. In the following description, when the marine vessel including the outboard motor 101 mounted thereon advances, namely, when the hull of the marine vessel progresses forward, the progressing direction is referred to as the "forward direction with respect to the outboard motor 101". A direction having an angle of 180 degrees thereto, i.e., a direction opposite thereto is referred to as the "backward direction". When the hull of the marine vessel progresses forward, the left side with respect to the progressing direction is referred to as the "left side with respect to the outboard motor" or simply as the "left side", and the right side with respect to the progressing direction is referred to as the "right side with respect to the outboard motor" or simply as the "right side". When the hull of the marine vessel progresses forward, the left-right direction of the outboard motor 101 is referred to as the "width direction of the outboard motor 101". The terms "upstream" and "downstream" respectively refer to upstream and downstream with respect to the direction in which exhaust gas flows.

Figure 2:
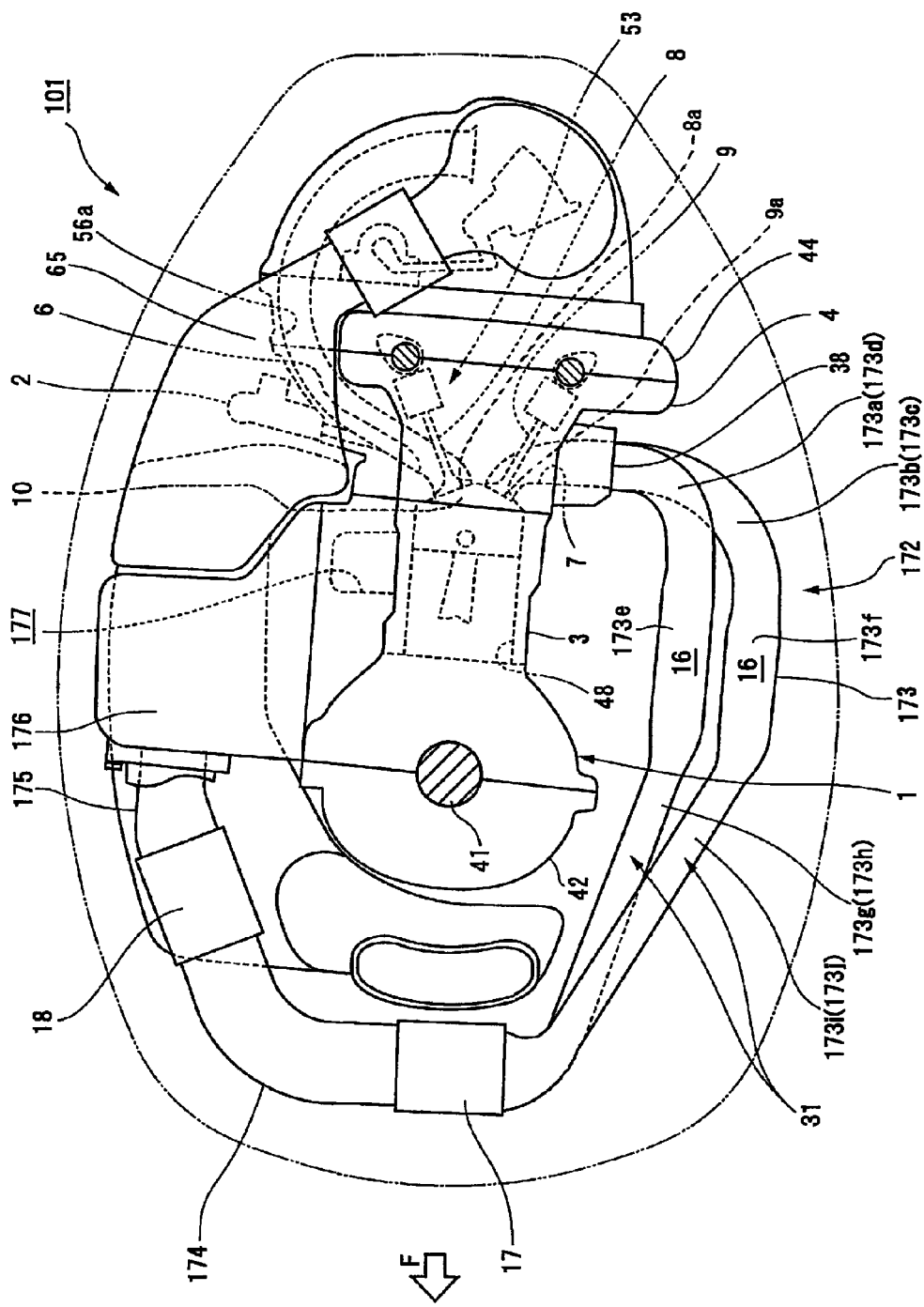
FIG. 2 is an enlarged plan view of an internal combustion engine portion of an outboard motor.

As shown in FIG. 2, the internal combustion engine 1 includes a crank case 42 and a cylinder body 3 both for rotatably supporting a craft shaft 41, a cylinder head 4 attached to the cylinder body 3, a head cover 44 attached to the cylinder head 4, and the like. The internal combustion engine 1 is preferably mounted in a state where the crank case 42 is located forward with respect to the cylinder head 4; in other words, in a state where the crank case 42 is closer to the hull than the cylinder head 4. These elements are preferably arranged in the front/rear direction of the outboard motor 101 from forward to backward in the order of the crank case 42, the cylinder body 3, the cylinder head 4, and the head cover 44. Inside the cylinder body 3 and the cylinder head 4, combustion chambers 10 are provided.

In the cylinder body 3, four cylinders 48 are preferably arranged in an up/down direction. The cylinder head 4 has a downstream section 6 of an intake path and an upstream section 7 of an exhaust path of each cylinder provided therein. The cylinder head 4 accommodates an intake valve 8 arranged to open or close an intake port 8a, and an exhaust valve 9 arranged to open or close an exhaust port 9a. The cylinder head 4 also accommodates a valve driving device 53 arranged to drive the intake valve 8 and the exhaust valve 9 and an injector 2. The injector 2 is provided in each cylinder and injects fuel into the inside of the downstream section 6 of the intake path. An upstream end of the downstream section 6 of the intake path provided in the cylinder head 4 is opened at a right side surface of the cylinder head 4. A downstream end of the upstream section 7 of the exhaust path is opened at a left side surface of the cylinder head 4.

The opening of the upstream section 7 of the exhaust path acts as an exhaust gas outlet 38. This opening is the downstream end of the upstream section 7 of the exhaust path, which is opened at the left side surface of the cylinder head 4. The exhaust gas outlet 38 is opened at the left side surface of the cylinder head 4. In other words, the exhaust gas outlet 38 is opened in the opposite direction to the downstream section 6 of the intake path in the width direction of the outboard motor 101.

Figure 3:
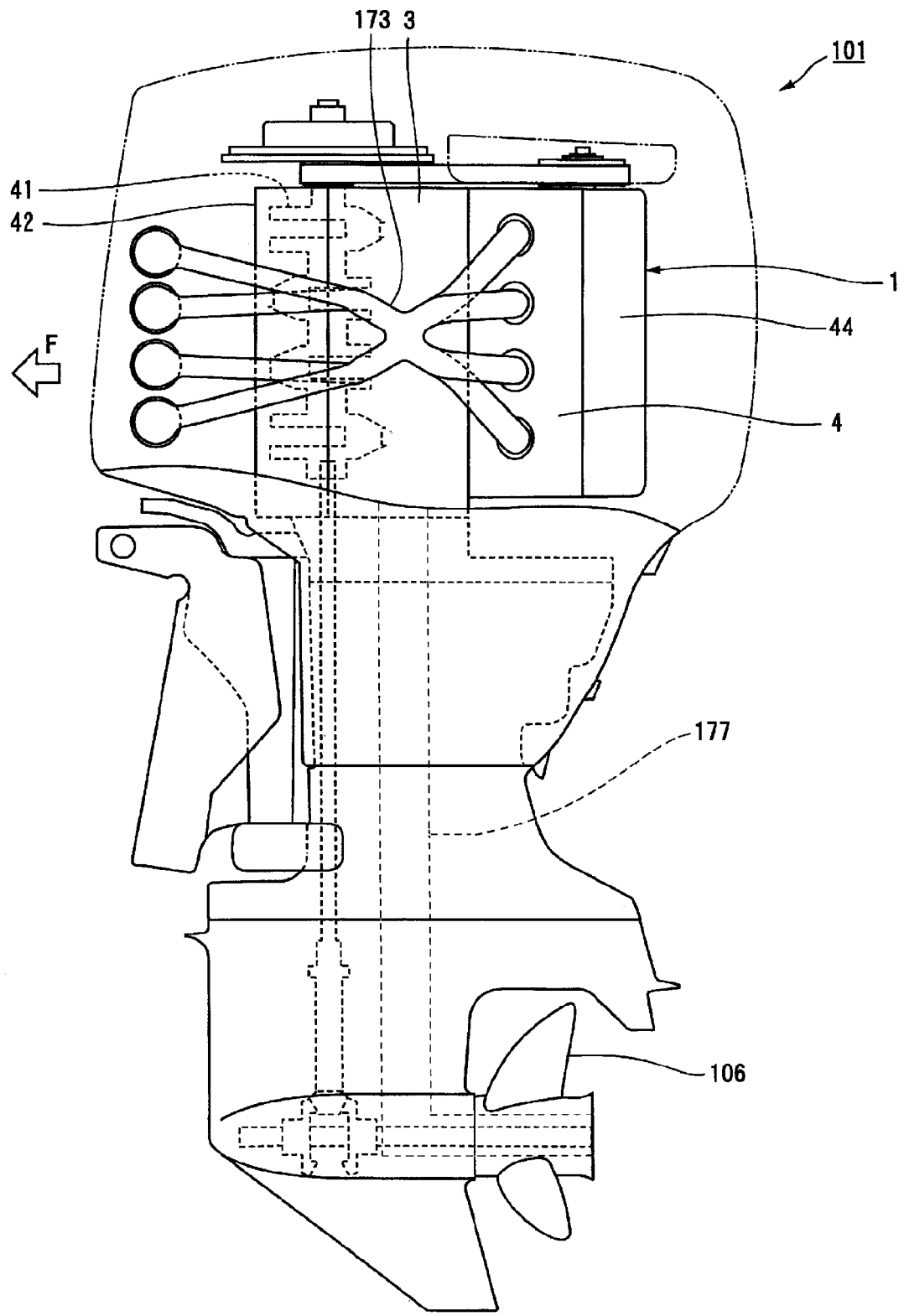
FIG. 3 is a side view of a multi-cylinder internal combustion engine according to Preferred Embodiment 1.
Figure 4:
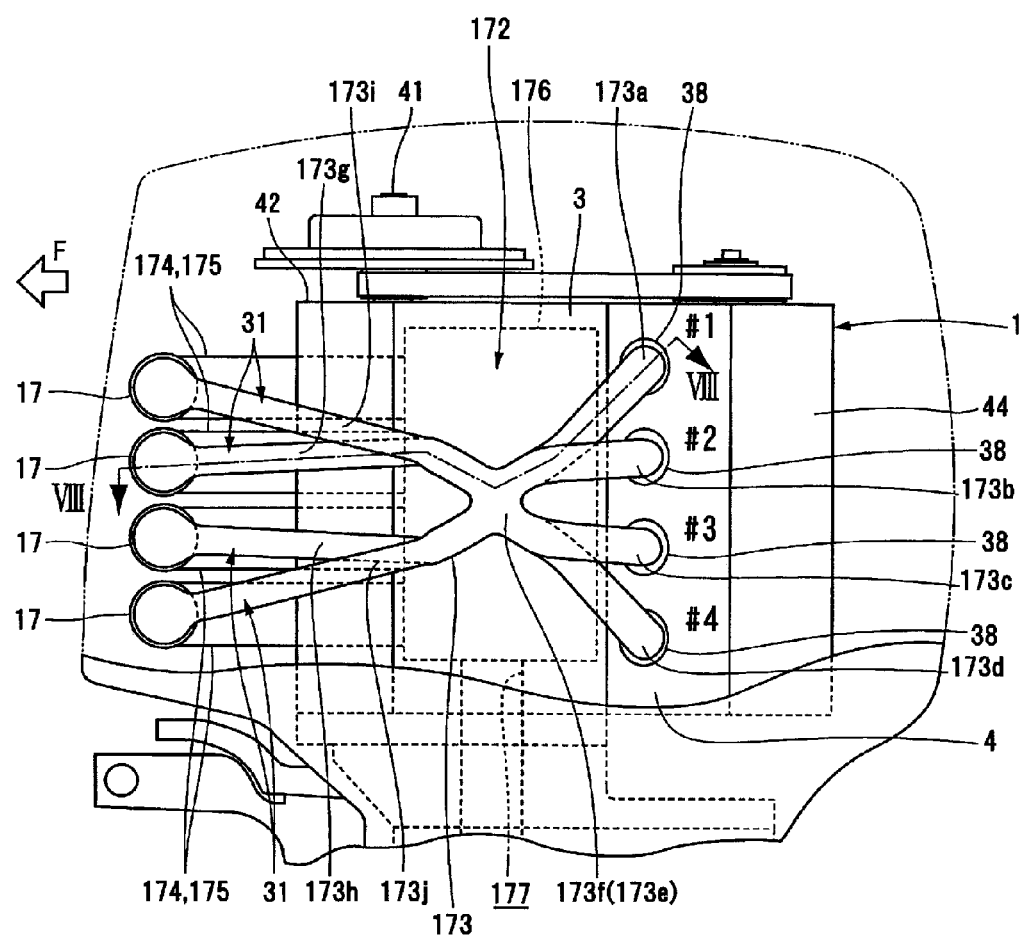
FIG. 4 is an enlarged side view of an internal combustion engine portion of an outboard motor.

As shown in FIG. 3 and FIG. 4, an exhaust device 172 according to the present preferred embodiment includes an upstream section 7 of the exhaust path, a first exhaust pipe 173, a second exhaust pipe 174, a third exhaust pipe 175, an exhaust chamber 176, a main exhaust path 177, a first catalyst 17 and a second catalyst 18. The main exhaust path 177 extends downward from a bottom end of the exhaust chamber 176. The main exhaust path 177 is opened in the water in a center portion of a propeller 106.

The first catalyst 17 and the second catalyst 18 are both preferably a three-way catalyst. The first catalyst 17 is provided in a connection portion of the first exhaust pipe 173 and the second exhaust pipe 174. The second catalyst 18 is provided in a connection portion of the second exhaust pipe 174 and the third exhaust pipe 175.

An upstream end of the first exhaust pipe 173 is connected to the exhaust gas outlet 38. The second exhaust pipe 174 is connected to a downstream end of the first exhaust pipe 173. The third exhaust pipe 175 is connected to a downstream end of the second exhaust pipe 174. The exhaust chamber 176 is connected to a downstream end of the third exhaust pipe 175.

Exhaust gas discharged from each of the cylinders of the internal combustion engine 1 flows into the exhaust chamber 176 via the first exhaust pipe 173, the second exhaust pipe 174 and the third exhaust pipe 175. The exhaust gas in each cylinder of the internal combustion engine 1, which has flowed into the exhaust chamber 176, is merged together in the exhaust chamber 176 and is discharged to an upstream end of the main exhaust path 177. The exhaust gas introduced into the inside of the main exhaust path 177 is discharged into the water from the center portion of the propeller 106. In the present preferred embodiment, the exhaust path 16 is defined by a space inside the first exhaust path 173, the second exhaust path 174, the third exhaust path 175, the exhaust chamber 176 and the main exhaust path 177.

As shown in FIG. 4, in the internal combustion engine 1, the shaft line of the crank shaft 41 is directed in the up/down direction. The internal combustion engine 1 is mounted on the outboard motor in a state where #1 cylinder through #4 cylinder are located backward with respect to the crank shaft 41 (located opposite to the hull with respect to the crank shaft 41). In the present preferred embodiment, among the four cylinders of the internal combustion engine 1, the cylinder located at an uppermost position is referred to as "#1 cylinder", and the cylinders located below #1 cylinder are sequentially referred to as "#2 cylinder", "#3 cylinder" and "#4 cylinder". The order of ignition for the internal combustion engine 1 is #1 cylinder to #3 cylinder to #4 cylinder to #2 cylinder. #1 cylinder and #4 cylinder are different in the ignition time by 360 degrees of the crank angle, and a period in which the exhaust port 9a of #1 cylinder is opened does not overlap a period in which the exhaust port 9a of #4 cylinder is opened. #2 cylinder and #3 cylinder are different in the ignition time by 360 degrees of the crank angle, and a period in which the exhaust port 9a of #2 cylinder does not overlap a period in which the exhaust port 9a of #3 cylinder is opened.

Among two exhaust pipes each including two first exhaust pipes 173 combined together, one exhaust pipe is an upstream section 173a for #1 cylinder, an upstream section 173d for #4 cylinder, a first connection section 173e, a first downstream section 173g and a second downstream section 173h. The first connection section 173e connects a downstream end of the upstream section 173a for #1 cylinder and a downstream end of the upstream section 173d for #4 cylinder to each other. The first downstream section 173g and the second downstream section 173h are each connected to the first connection section 173e and branched from the first connection section 173e to extend downward. Among the two exhaust pipes each including two first exhaust pipes 173 combined together, the other exhaust pipe is an upstream section 173b for #2 cylinder, an upstream section 173c for #3 cylinder, a second connection section 173f, a third downstream section 173i and a fourth downstream section 173j. The second connection section 173f connects the upstream section 173b for #2 cylinder and a downstream end of the upstream section 173c for #3 cylinder to each other. The third downstream section 173i and the fourth downstream section 173j are each connected to the second connection section 173f and branched from the second connection section 173f to extend downward.

In each of the first downstream section 173g, the second downstream section 173h, the third downstream section 173i and the fourth downstream section 173j, a convergent-divergent nozzle 31 described below is provided.

Figure 5:
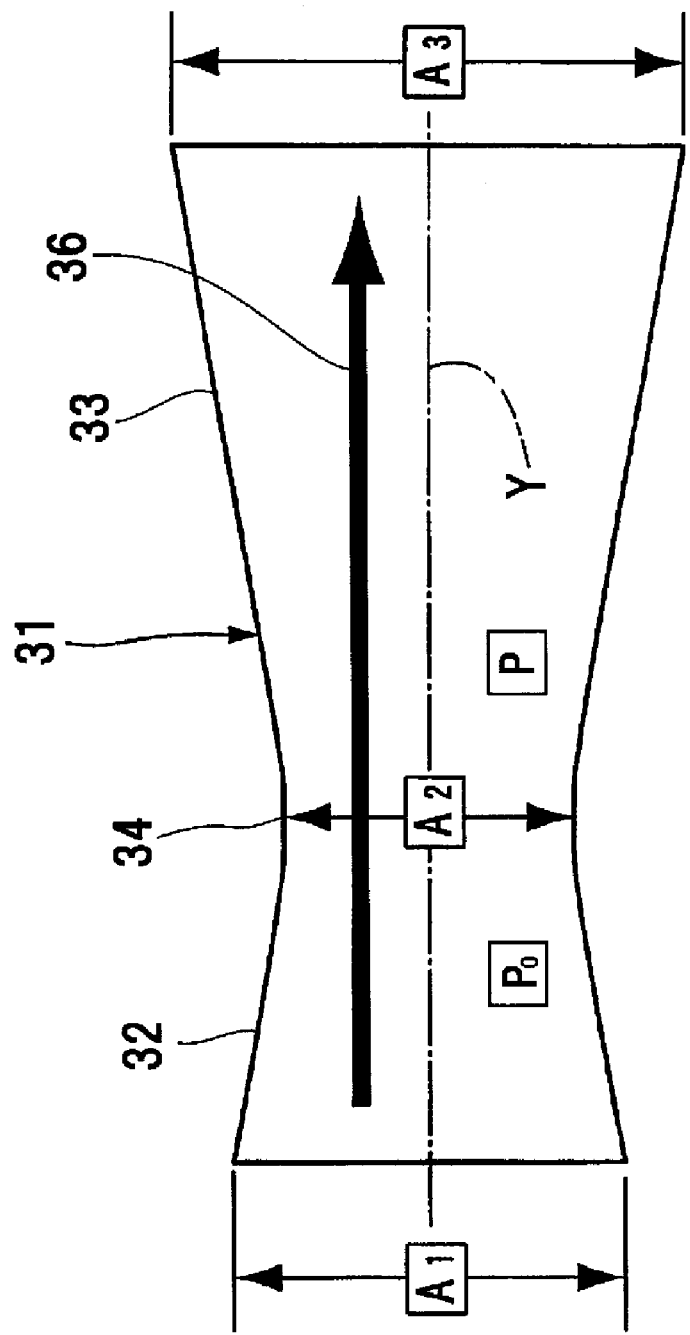
FIG. 5 is a schematic view of a convergent-divergent nozzle.

FIG. 5 is a schematic view of a general convergent-divergent nozzle 31. The convergent-divergent nozzle 31 has a convergent section 32 including a flow path cross-sectional area which decreases as a fluid progresses, a divergent section 33 provided downstream with respect to the convergent section 32 and including a flow path cross-sectional area which increases as the fluid progresses, and a throat section 34 provided between the convergent section 32 and the divergent section 33 and including the smallest flow path cross-sectional area. In FIG. 5, the arrow indicates the direction in which the fluid progresses. In the present preferred embodiment, the fluid is the exhaust gas 36.

The convergent-divergent nozzle 31 accelerates the velocity of the exhaust gas flowing in the exhaust path 16 from a subsonic velocity to an ultrasonic velocity. Flow path cross-sectional area A1 at an upstream end of the convergent section 32, flow path cross-sectional area A2 of the throat section 34, and flow path cross-sectional area A3 at a downstream end of the divergent section 33 have the relationships of A1>A2 and A2<A3. Flow path cross-sectional area A2 of the throat section 34 is the same as flow path cross-sectional area A2 at a downstream end of the convergent section 32 and the flow path cross-sectional area at an upstream end of the divergent section 33. In the present preferred embodiment, the flow path cross-sectional areas of the convergent section 32 and the divergent section 33 each change at a constant rate in the flow direction. There is no specific limitation on the shape of the convergent section 32 and the divergent section 33. The convergent section 32 and the divergent section 33 may have a shape including a flow path cross-sectional area changing step by step like a nozzle adopted for rockets, or may have a smoothly curved shape.

The convergent-divergent nozzle 31 is configured to fulfill the conditions represented by expressions (1) and (2) below. By the velocity of the exhaust gas flowing into the throat section 34 reaching Mach 1 (i.e., the sonic velocity), the exhaust gas in the divergent section 33 can be accelerated to an ultrasonic velocity.

Expression 1

$$\frac{dM}{dx} = \frac{\Lambda}{1 - M^2} \quad (1)$$

Expression 2

$$\Lambda \equiv M\left[1 + \frac{\gamma - 1}{2}M^2\right]\left[\frac{\gamma M^2}{2}\left(\frac{4f}{D}\right) - \frac{1}{A}\frac{dA}{dx}\right] \quad (2)$$

Among these expressions, expression (1) represents the relationship between the shape of the exhaust pipe and the Mach number in a primary flow accompanied by viscous friction. Expression (2) represents $\Lambda$ in expression (1). In these expressions, M represents the Mach number, A represents the cross-sectional area of the exhaust pipe at an arbitrary cross-section, D represents the diameter of the pipe at the arbitrary cross-section, $\gamma$ represents the specific heat ratio, x represents the distance in the flow direction, and f represents the frictional coefficient.

Figure 6:
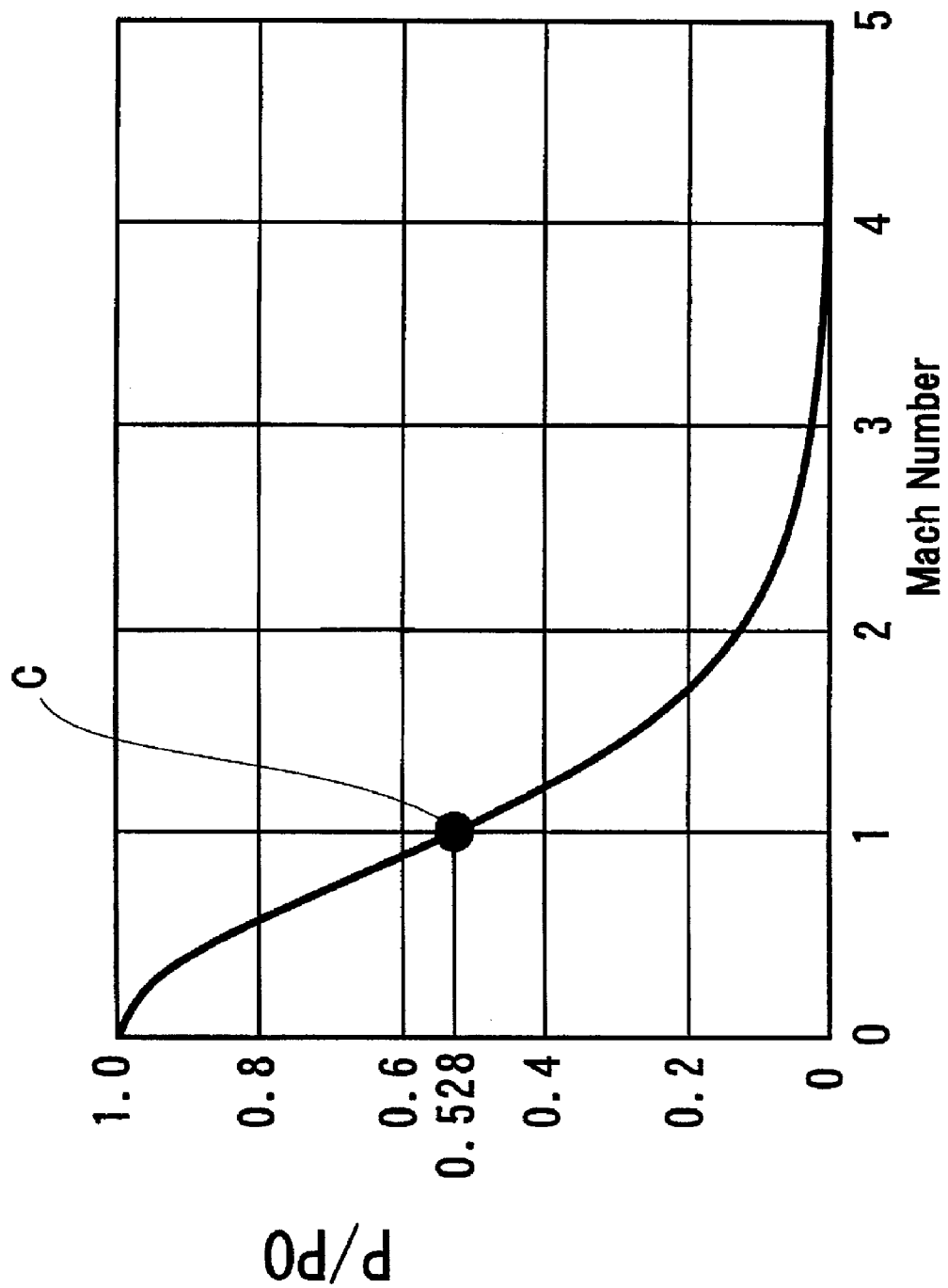
FIG. 6 shows the relationship between the pressure ratio and the Mach number in the convergent-divergent nozzle.

With the convergent-divergent nozzle 31 including the above-described structure, when the pressure ratio of the full pressure P0 of the fluid in the convergent section 32 and the static pressure P of the fluid in the divergent section 33, i.e., P/P0, is smaller than the critical pressure ratio of 0.528, the velocity of the fluid is the sonic velocity in the throat section and is an ultrasonic velocity in the divergent section 33. FIG. 6 shows the pressure ratio of the full pressure P0 of the fluid in the convergent section 32 and the static pressure P of the fluid in the divergent section 33, i.e., P/P0, and the velocity of the fluid passing the divergent section 33 at each pressure ratio. When the full pressure P0 in the convergent section 32 is increased in order to make P/P0 smaller than the critical pressure ratio, the velocity can be at an ultrasonic velocity in the convergent-divergent nozzle 31.

When the velocity becomes an ultrasonic velocity in the convergent-divergent nozzle 31, a shock wave propagating in a downstream direction in the divergent section 33 and an expansion wave propagating in an upstream direction in the divergent section 33 are generated. Therefore, the fluid in a space between the shock wave progressing in the downstream direction in the exhaust path 16 and the expansion wave progressing in the upstream direction in the exhaust path 16 expands rapidly, and so the pressure of the exhaust gas 36 flowing in the exhaust path 16 can be decreased. As a result, the temperature of the exhaust gas 36 can be rapidly decreased by an adiabatic cooling effect caused by adiabatic expansion. As a result of active studies, the present inventors have achieved such a state by providing the convergent-divergent nozzle 31 in the exhaust path 16 and connecting a portion of the exhaust path which is upstream with respect to the convergent-divergent nozzle 31 in a specific manner.

Figure 7A:
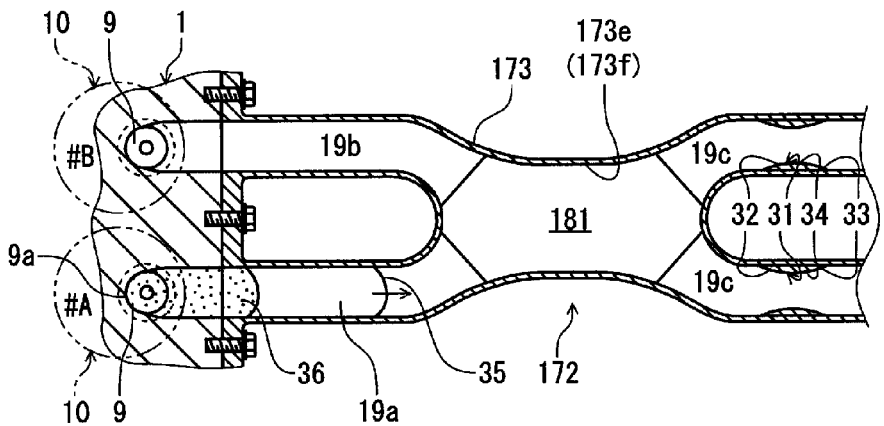
Figure 7B:
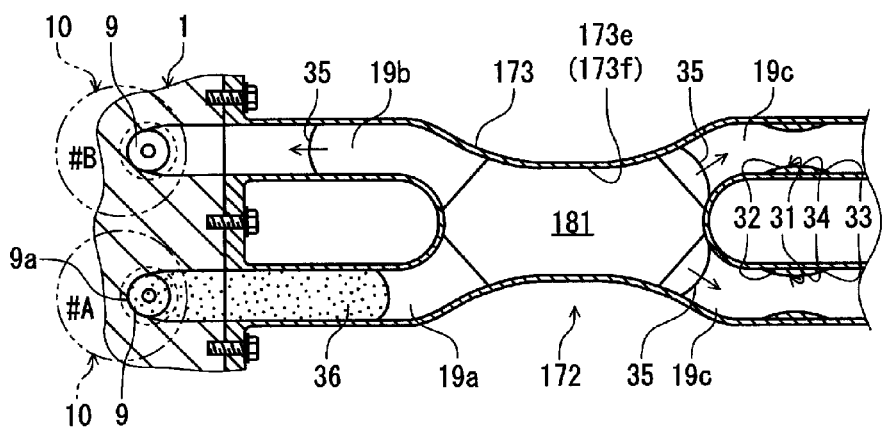
Figure 7C:
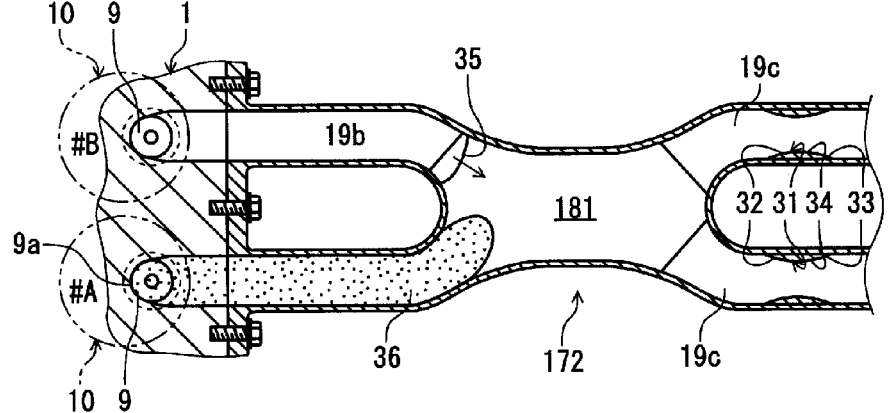

Now, with reference to FIGS. 7A through 7C, a method for generating a large negative pressure in the exhaust path will be described. FIGS. 7A through 7C schematically show the exhaust device 172 in the present preferred embodiment. #A cylinder and #B cylinder are different in the ignition time by 360 degrees of the crank angle, and the period in which the exhaust port 9a of #A cylinder is opened does not overlap the period in which the exhaust port 9a of #B cylinder is opened.

In FIGS. 7A through 7C, a portion of the exhaust path 16 which is upstream with respect to the upstream end of the divergent section 33 is referred to as an "exhaust merging section". In the exhaust merging section, a portion which is upstream with respect to a connection section 181 and is connected to the exhaust port 9a of #A cylinder is referred to as a "first merging upstream section 19a". A portion which is upstream with respect to the connection section 181 and is connected to the exhaust port 9a of #B cylinder is referred to as a "second merging upstream section 19b". Portions of the exhaust merging section which are downstream with respect to the connection section 181 are each referred to as a "merging downstream section 19c". In FIGS. 7A through 7C, identical or equivalent elements to those in any of FIG. 1 through FIG. 5 bear identical reference numerals assigned thereto, and descriptions thereof are omitted when not necessary.

As shown in FIG. 7A, when the exhaust port 9a is opened in an exhaust stroke in #A cylinder, the exhaust gas 36 of a high pressure is injected from the combustion chamber 10 into the first merging upstream section 19a of the exhaust path 16. At the time when the exhaust port 9a starts opening, the pressure difference between the combustion chamber 10 and the first merging upstream section 19a is large. Therefore, the velocity of the exhaust gas 36 becomes the sonic velocity and so a shock wave 35 is generated in the first exhaust merging section 19a. As the opening angle of the exhaust port 9a increases, the amount of the exhaust gas 36 flowing into the first exhaust merging section 19a increases but the velocity of the exhaust gas 36 decreases. The velocity of the exhaust gas 36 also decreases as the exhaust gas 36 progresses in the first exhaust merging section 19a. The shock wave 35 propagates in the downstream direction in the first exhaust merging section 19a at a high velocity. Meanwhile, the exhaust gas 36 progresses in the downstream direction in the first exhaust merging section 19a with a slight delay with respect to, and at a lower velocity than, the shock wave 35.

As shown in FIG. 7B, the shock wave 35 progressing inside the first exhaust merging section 19a is separated into shock waves respectively propagating in two merging downstream sections 19c and a shock wave propagating in the second exhaust merging section 19b when passing the connection section 181. These shock waves progress separately in the merging downstream sections 19c and the second exhaust merging section 19b. The shock waves 35 progressing in the merging downstream sections 19c are attenuated and disappear after passing the convergent-divergent nozzle 31. By contrast, the shock wave 35 progressing in the second exhaust merging section 19b is reflected by the exhaust valve 9 closing the exhaust port 9a of #B cylinder and progresses oppositely in the second exhaust merging section 19b to return to the connection section 181.

As shown in FIG. 7C, the size of the exhaust merging section 19 is designed such that the time when the reflected shock wave 35 returns to the connection section 181 from the second exhaust merging section 19b is the same as, or after, the time when the exhaust gas 36 of a high pressure discharged from #A cylinder and progressing in the first exhaust merging section 19a with a delay with respect to the shock wave 35 reaches the connection section 181. Therefore, the reflected shock wave 35 and the exhaust gas 36 collide against each other at a position which is downstream with respect to an upstream end of the connection section 181 and upstream with respect to the upstream end of the divergent section 33.

By causing the reflected shock wave 35 and the exhaust gas 36 to collide against each other at a position which is downstream with respect to the upstream end of the connection section 181 and upstream with respect to the divergent section 33, the pressure of the exhaust gas 36 flowing in the exhaust path can be increased. When this occurs, the full pressure P0 in the convergent section of the convergent-divergent nozzle 31 is increased. Thus, the ratio of the full pressure P0 in the convergent section and the static pressure P in the divergent section, i.e., P/P0, becomes smaller than the critical pressure ratio of about 0.528. As a result, the velocity of the exhaust gas 36 reaches the sonic velocity in the throat section 34.

Figure 8:
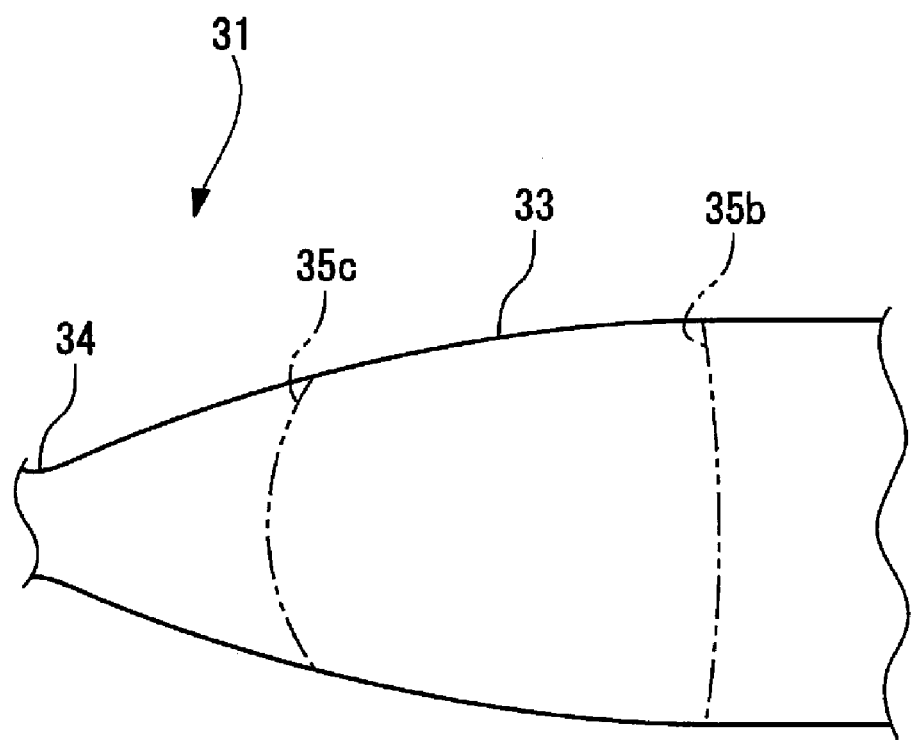
FIG. 8 is a schematic view drawn based on a photograph of an inside of the convergent-divergent nozzle taken by the Schlieren method.

FIG. 8 is a schematic view drawn based on a photograph of an inside of the convergent-divergent nozzle taken by the Schlieren method. As a result of the velocity of the exhaust gas 36 reaching the sonic velocity, a new shock wave 35b is generated in the convergent-divergent nozzle 31. The new shock wave 35b is accelerated when passing the divergent section 33 of the convergent-divergent nozzle 31. As shown in FIG. 8, when the shock wave 35b is generated, an expansion wave 35c progressing oppositely to the shock wave 35b is generated. As a result of the shock wave 35b being accelerated in the divergent section 33 and by the expansion wave 35c progressing oppositely to the shock wave 35b, the pressure of the exhaust gas 36 present between the shock wave 35b and the expansion wave 35c is significantly decreased to be equal to or lower than the atmospheric pressure by adiabatic expansion.

Figure 9:
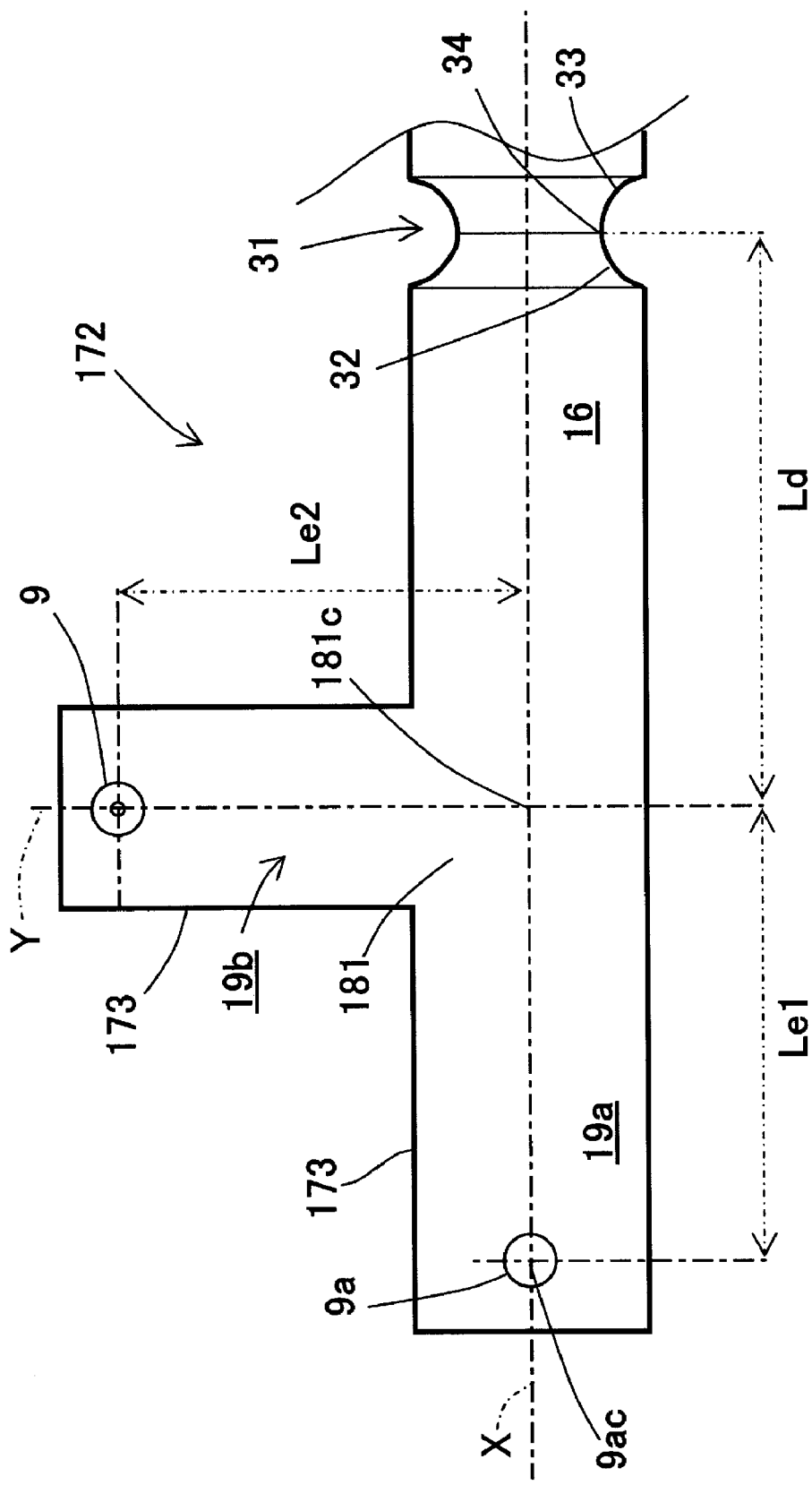
FIG. 9 is a schematic view of the exhaust path and the like, showing a route in the exhaust path in which the shock wave progresses and a route in the exhaust path in which the exhaust gas progresses.

As shown in FIG. 9, the point at which center line X of the flow path cross-section of the first merging upstream section 19a and center line Y of the flow path cross-section of the second merging upstream section 19b cross each other is set as connection center 181c. The distance between center 9ac of the exhaust port 9a of #A cylinder and the connection center 181c is set as Le1, and the distance between the exhaust valve 9 of #B cylinder and the connection center 181c is set as Le2. The velocity of the exhaust gas 36 is set as Ve, and the propagation velocity of the shock wave 35 is set as Vs. In this case, time $T_1$, which is from when the exhaust port 9a of #A cylinder is opened until the exhaust gas 36 reaches the connection section 181, is represented by expression (3). Time $T_2$, which is from when the exhaust port 9a of #A cylinder is opened until the shock wave 35 is reflected by the exhaust valve 9 of #B cylinder and reaches the connection section 181, is represented by expression (4).

$$T_1 = Le1/Ve \quad (3)$$

$$T_2 = (Le1 + 2Le2)/Vs \quad (4)$$

When $T_1 \leq T_2$, the shock wave 35 and the exhaust gas 36 collide against each other downstream with respect to the connection section 181. Specifically, when $Le1/Ve \leq (Le1+2Le2)/Vs$, the shock wave 35 and the exhaust gas 36 collide against each other downstream with respect to the upstream end of the connection section 181. For the sake of convenience, for example, the maximum velocity of the exhaust gas 36 may be regarded as the velocity Ve, or the average velocity of the exhaust gas 36 may be regarded as the velocity Ve. Similarly, for example, the maximum propagation velocity of the shock wave 35 may be regarded as the propagation velocity Vs, or the average propagation velocity of the shock wave 35 may be regarded as the propagation velocity Vs.

As shown in FIG. 9, the distance from the connection center 181c to the upstream end of the divergent section 33 of the convergent-divergent nozzle 31 is set as Ld, and the time from when the exhaust port 9a is opened until the exhaust port 9a is closed is set as tv. Time $T_3$, which is from when the exhaust port 9a of #A cylinder is opened until a trailing end of the exhaust gas 36 reaches the upstream end of the divergent section 33, is represented by expression (5). Time $T_4$, which is from when the exhaust port 9a of #A cylinder is opened until the shock wave 35 is reflected by the exhaust valve 9 of #B cylinder and reaches the upstream end of the divergent section 33, is represented by expression (6).

$$T_3 = tv + (Le1 + Ld)/Ve \quad (5)$$

$$T_4 = (Le1 + 2Le2 + Ld)/Vs \quad (6)$$

When $T_4 \leq T_3$, the shock wave 35 and the exhaust gas 36 collide against each other before the entirety of the exhaust gas 36 reaches the upstream end of the divergent section 33. Specifically, when $(Le1+2Le2+Ld)/Vs \leq tv+(Le1+Ld)/Ve$, the shock wave 35 and the exhaust gas 36 collide against each other before the entirety of the exhaust gas 36 reaches the upstream end of the divergent section 33.

In the above description, #A cylinder is in the exhaust stroke. As long as #B cylinder fulfills substantially the same conditions as #A cylinder, substantially the same effect is provided. Specifically, it is sufficient that #B cylinder fulfills the following expressions (7) and (8).

$$Le2/Ve \leq (Le2 + 2Le1)/Vs \quad (7)$$

$$(Le2 + 2Le1 + Ld)/Vs \leq tv + (Le2 + Ld)/Ve \quad (8)$$

Figure 10:
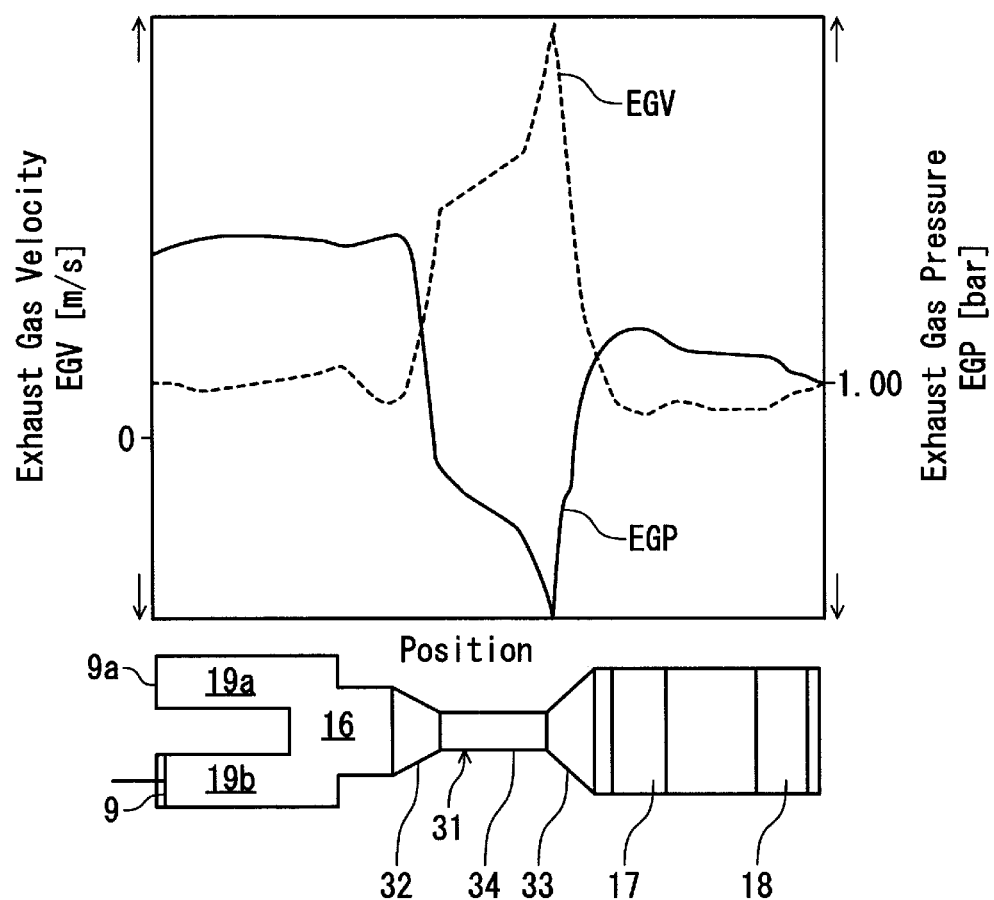
FIG. 10 is a graph showing the relationship between the exhaust gas velocity and the exhaust gas pressure at prescribed positions in a first exhaust pipe.
Figure 11:
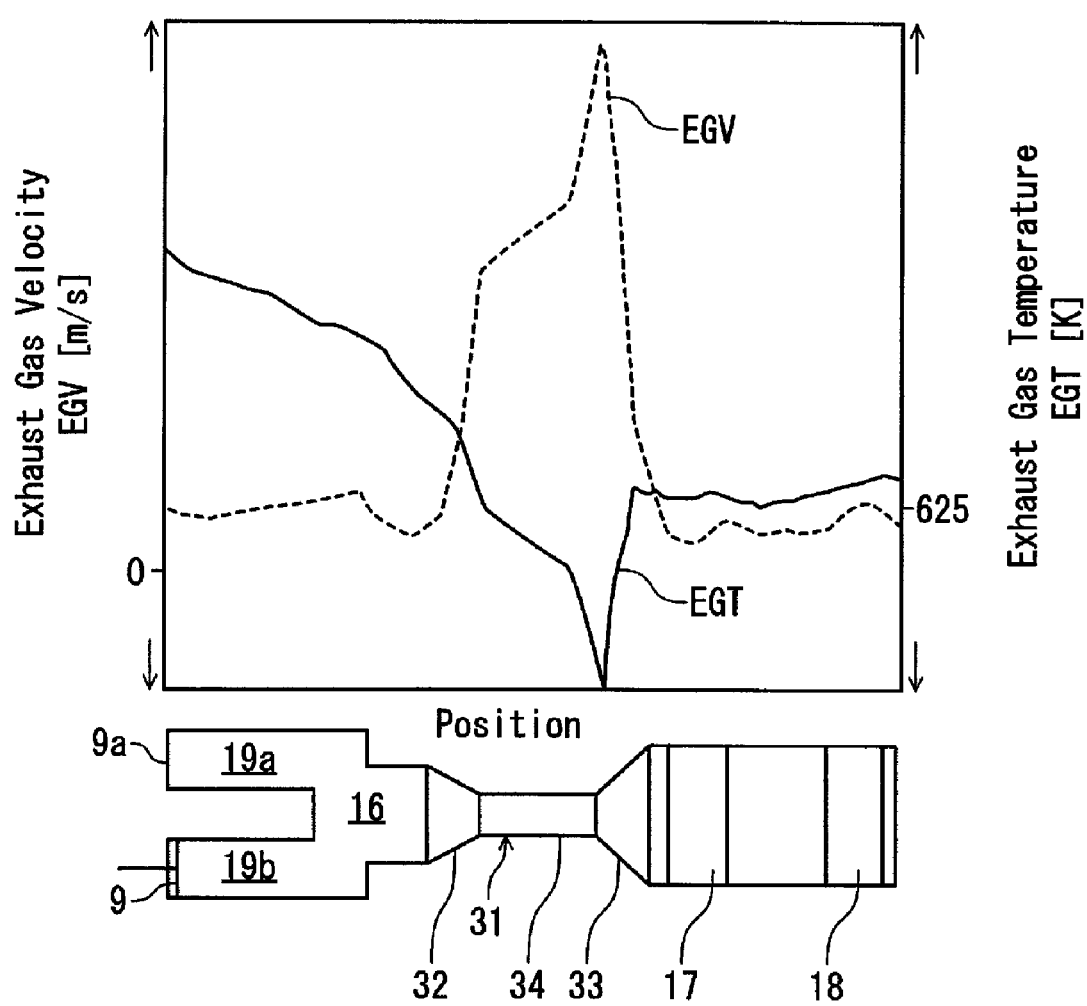
FIG. 11 is a graph showing the relationship between the exhaust gas velocity and the exhaust gas temperature at the prescribed positions in the first exhaust pipe.
Figure 12:
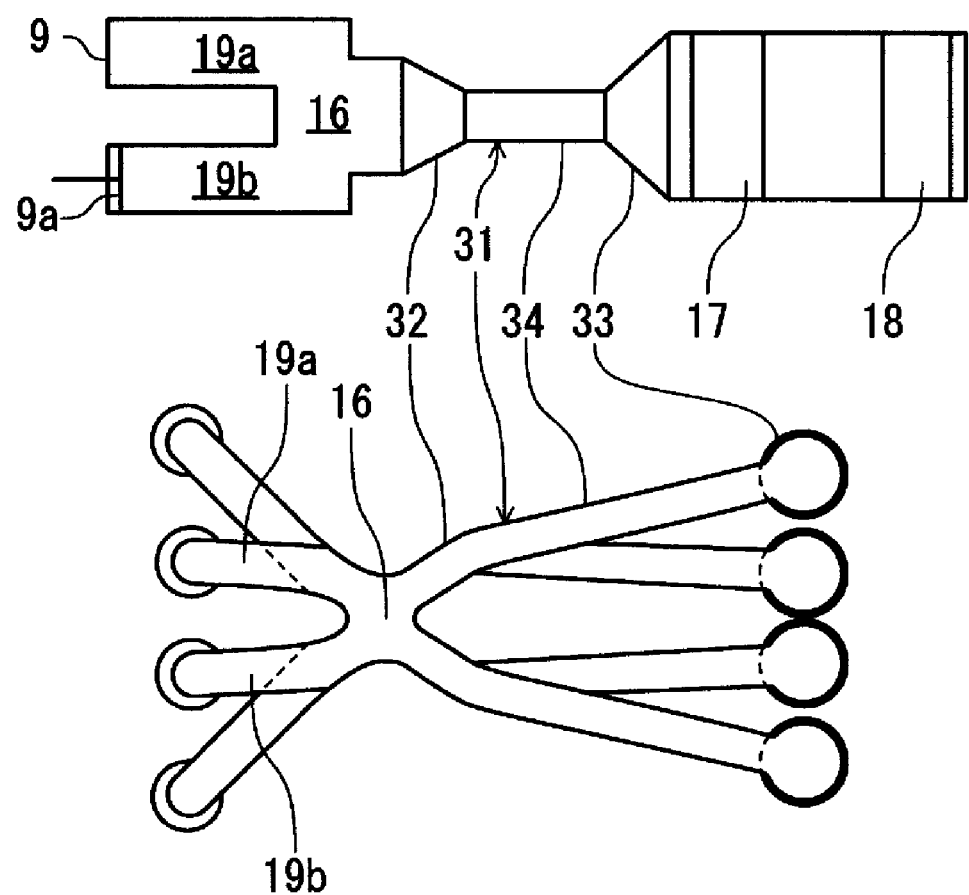
FIG. 12 shows correspondence between the exhaust path 16 in FIG. 10 and FIG. 11 and the exhaust path 16 in Preferred Embodiment 1.

FIG. 10 and FIG. 11 show the results of simulations performed by the present inventors. FIG. 12 shows the correspondence between the exhaust path 16 in FIG. 10 and FIG. 11 and the exhaust path 16 in the present preferred embodiment. FIG. 10 shows the exhaust gas velocity and the exhaust gas pressure at points in the exhaust path immediately after the new shock wave is generated in the convergent-divergent nozzle 31. FIG. 10 shows the exhaust gas velocity and the exhaust gas temperature at the points in the exhaust path 16 immediately after the new shock wave is generated in the convergent-divergent nozzle 31. After the shock wave is generated in the convergent-divergent nozzle 31, the shock wave is accelerated in the divergent section. When this occurs, as shown in FIG. 10 and FIG. 11, the velocity of the exhaust gas is rapidly increased, whereas the pressure and the temperature of the exhaust gas are rapidly decreased. FIG. 10 and FIG. 11 show the velocity of the exhaust gas and do not show the propagation velocity of the shock wave.

In the present preferred embodiment, the throat section 34 of the convergent-divergent nozzle 31 is set to be relatively long. After the shock wave reflected by the branch section collides against the exhaust gas, the shock wave propagates in the throat section 34 preceding the exhaust gas. At this point, adiabatic expansion is generated in the space between the exhaust gas 36 and the shock wave 35 and thus the pressure is slightly decreased. Therefore, the exhaust gas 36 is sucked by the shock wave 35 to flow in the throat section 34, without decreasing in the velocity. Therefore, by setting the length of the throat section 34 having a constant flow path cross-sectional area in accordance with the internal combustion engine, the timing at which the shock wave 35 is to be accelerated in the divergent section 33, in other words, the timing at which the exhaust gas 36 is to be put into a low pressure and low temperature state, can be set in accordance with the internal combustion engine.

As described above, the internal combustion engine 1 according to the present preferred embodiment can significantly decrease the temperature and pressure of the exhaust gas 36 in the exhaust path 16 as compared with the conventional art. In the internal combustion engine 1 according to the present preferred embodiment, only the exhaust ports 9a of the combustion chambers, the opening periods of which do not overlap, are connected upstream with respect to the divergent section 33. Therefore, the internal combustion engine 1 is not influenced by exhaust gas from the other cylinders unlike in the conventional art. By decreasing the temperature and pressure of the exhaust gas in this manner, the performance of the internal combustion engine 1 can be improved, for example, as described below.

As a result of the significant decrease of the pressure of the exhaust gas as in the present preferred embodiment, the pumping loss of the internal combustion engine 1 can be reduced. Since the pressure of the exhaust gas 36 in the exhaust path 16 is significantly decreased, the piston (not shown) of the internal combustion engine 1 is pulled toward the exhaust path 16, namely, toward the top dead center in the exhaust stroke, and so the work necessary for driving the piston in the exhaust stroke is reduced.

Figure 13A:
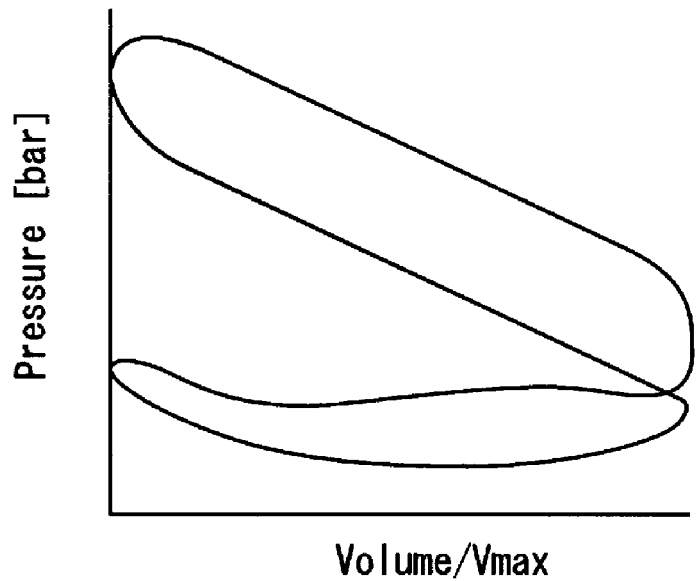
Figure 13B:
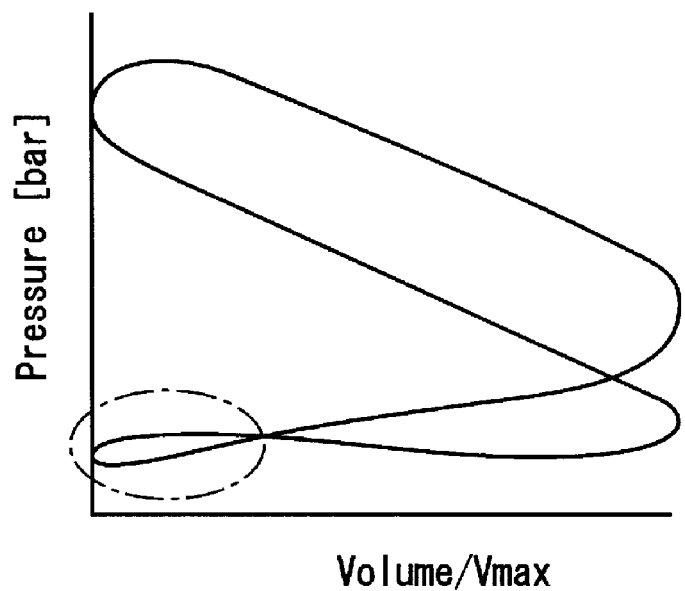

This will be further described with reference to FIGS. 13A and 13B. FIG. 13A shows a P-V diagram of a conventional internal combustion engine, and FIG. 13B shows a P-V diagram of the internal combustion engine 1 in the present preferred embodiment. As shown in FIG. 13B, in the present preferred embodiment, a region enclosed by the closed curve appears in the vicinity of the top dead center of the exhaust stroke of the internal combustion engine (in the region enclosed by the one-dot chain line). The region enclosed by the closed curve corresponds to the work conducted by the internal combustion engine 1. Specifically, when the pressure of the exhaust gas is significantly decreased by the generation of the shock wave 35b in the divergent section 33, the piston is pulled by the exhaust gas, which enables the internal combustion engine 1 to conduct a positive work in the exhaust stroke.

In the present preferred embodiment, the temperature of the exhaust gas 36 in the exhaust path 16 can be decreased upstream with respect to the first catalyst 17. At an excessively high temperature, the cleaning efficiency of a three-way catalyst is lowered by the phenomenon called "sintering". However, in the present preferred embodiment, the temperature of the first catalyst 17 and the second catalyst 18 can be prevented from becoming excessively high, and so sintering can be effectively prevented. According to the present preferred embodiment, even when the internal combustion engine is driven at a high load state, the temperature of the exhaust gas 36 can be decreased. Thus, the fuel can be combusted at the theoretical air/fuel ratio. Therefore, the exhaust gas 36 can be efficiently cleaned by the first catalyst 17 and the second catalyst 18.

As shown in FIG. 4, in the present preferred embodiment, the length of the upstream section 173a for #1 cylinder and the length of the upstream section 173d for #4 cylinder are the same. The length of the upstream section 173b for #2 cylinder and the length of the upstream section 173c for #3 cylinder are the same. Therefore, in the exhaust stroke, the time required for the shock wave 35 generated in the upstream section 173a for #1 cylinder to propagate to the upstream section 173d for #4 cylinder from the first connection section 173e and return to the first connection section 173e after being reflected by the exhaust valve 9 of #4 cylinder is the same as the time required for the shock wave 35 generated in the upstream section 173d for #4 cylinder to propagate to the upstream section 173a for #1 cylinder from the first connection section 173e and return to the first connection section 173e after being reflected by the exhaust valve 9 of #1 cylinder. This is also applicable to the upstream section 173b for #2 cylinder and the upstream section 173c for #3 cylinder.

As described above, regarding the first exhaust pipe 173 of the internal combustion engine 1 in the present preferred embodiment, the length of the upstream section 173a for #1 cylinder and the length of the upstream section 173d for #4 cylinder are the same, and the length of the upstream section 173b for #2 cylinder and the length of the upstream section 173c for #3 cylinder are the same. Therefore, the velocity of the exhaust gas 36 can be uniformly increased in the convergent-divergent nozzles 31 provided in the first through fourth downstream sections 173g through 173j, and so the pressure in all the exhaust paths 16 can be decreased substantially uniformly.

Preferred Embodiment 2

Figure 14:
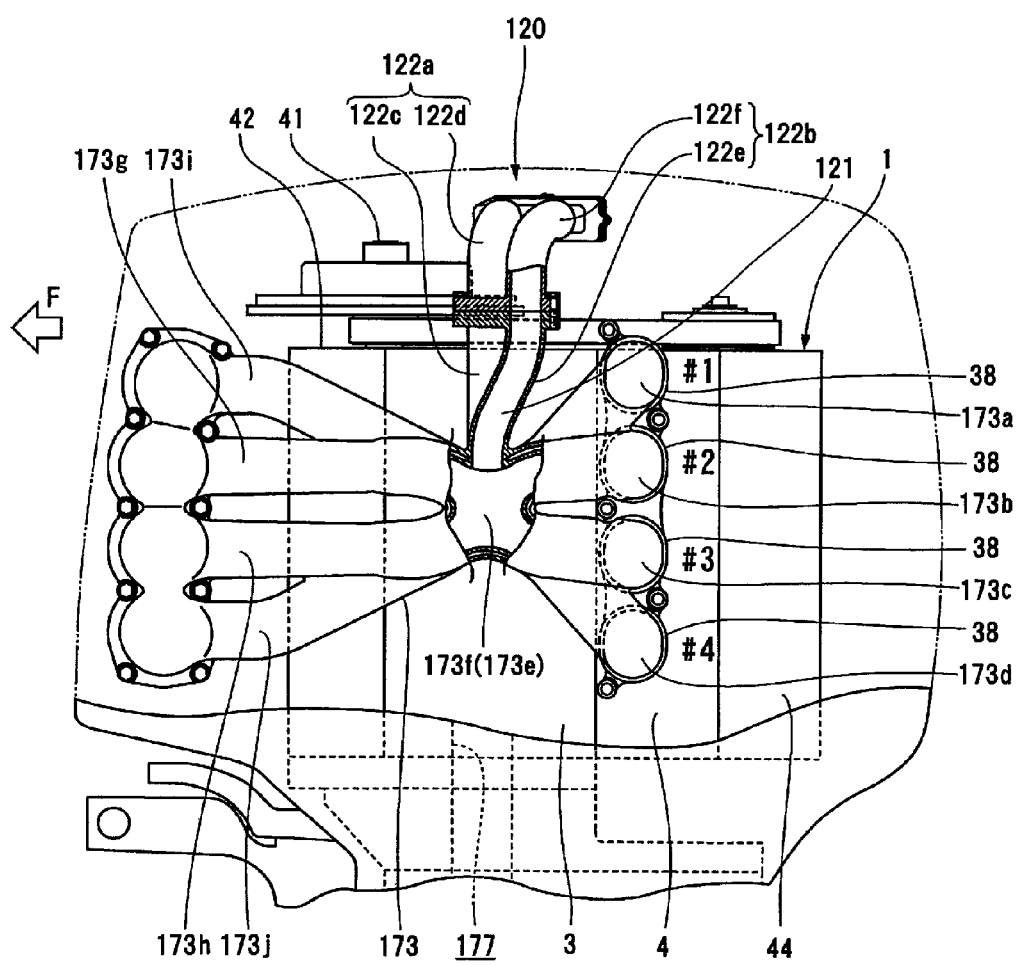
FIG. 14 is a side view of an exhaust pipe to which a secondary air supply pipe is connected, and shows the exhaust pipe and the secondary air supply pipe in a partially ruptured state.
Figure 15:
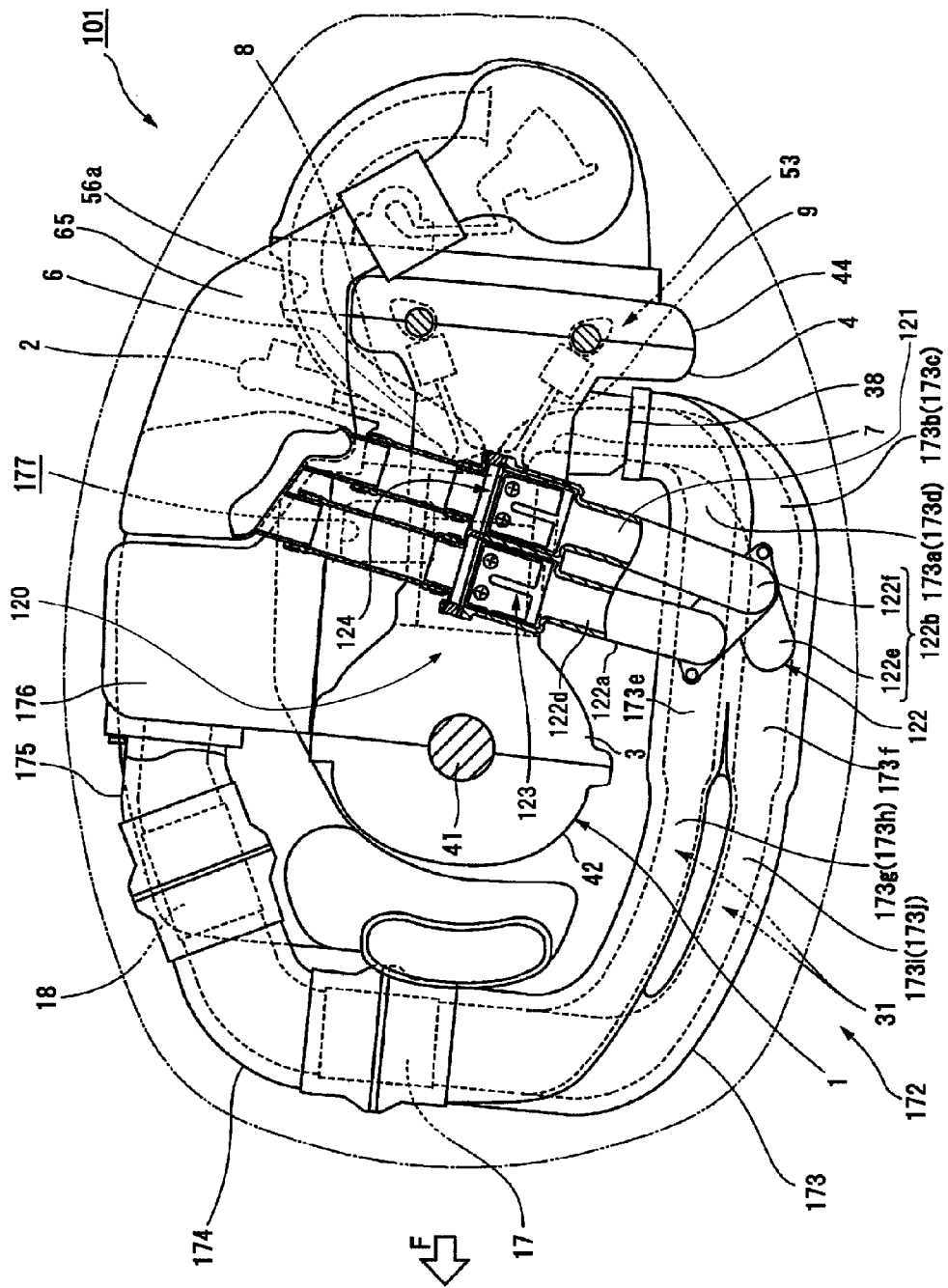
FIG. 15 is a plan view of the exhaust pipe to which the secondary air supply pipe is connected, and shows the secondary air supply pipe, lead valves and communication pipes in a partially ruptured state.

According to a preferred embodiment of the present invention, since a large negative pressure is generated in the exhaust path 16, secondary air is easily supplied to the exhaust path 16. Thus, as shown in FIG. 14 and FIG. 15, a secondary air supply system 120 may be provided in the exhaust path 16. Except for this structural difference, Preferred Embodiment 2 is the same as Preferred Embodiment 1. Accordingly, the detailed description of Preferred Embodiment 2 is provided by the detailed description of FIG. 1 through FIG. 13B relating to Preferred Embodiment 1.

As shown in FIG. 14 and FIG. 15, the secondary air supply system 120 includes a secondary air supply pipe 122, a first lead valve 123, and a second lead valve 124. The secondary air supply pipe 122 preferably includes a first secondary air supply pipe 122a connected to the first connection section 173e and a second secondary air supply pipe 122b connected to the second connection section 173f. The first secondary air supply pipe 122a is connected to an intake device 65 of the internal combustion engine 1 via the first lead valve 123. The second secondary air supply pipe 122b is connected to the intake device 65 of the internal combustion engine 1 via the second lead valve 124.

The first secondary air supply pipe 122a preferably includes a bottom portion 122c integrally formed with the first exhaust pipe 173 by casting, for example, and a top portion 122d attached to an upstream end of the bottom portion 122c. The second secondary air supply pipe 122b preferably includes a bottom portion 122e integrally formed with the first exhaust pipe 173 preferably by casting, for example, and a top portion 122f attached to an upstream end of the bottom portion 122e.

The provision of the first lead valve 123 and the second lead valve 124 can prevent the exhaust gas from flowing into the intake device 65 of the internal combustion engine 1 from a secondary air supply path 121. The first lead valve 123 and the second lead valve 124 are opened by a negative pressure generated in the exhaust path 16 to supply air to the exhaust path 16 via the secondary air supply pipe 122.

In the present preferred embodiment, the air can be efficiently supplied into the exhaust path 16 by a negative pressure generated in the exhaust path 16. The negative pressure is significantly higher than, that is, the pressure is significantly lower than, that in a general internal combustion engine which does not include the convergent-divergent nozzle 31. The phenomenon that a negative pressure is generated by the action of the convergent-divergent nozzle 31 continues even when the rotational speed of the internal combustion engine 1 increases to be higher than the rotational speed at the time of the maximum output. Therefore, in the present preferred embodiment, even when the rotational speed of the internal combustion engine 1 becomes high, a sufficient amount of air can be supplied to the exhaust path 16. In a conventional internal combustion engine, no negative pressure is generated in the exhaust path in a high rotational speed or high load state, and therefore a large pump is used to forcibly supply the air. Since the pump is driven by the internal combustion engine, the loss of the internal combustion engine output is large. By contrast, in the present preferred embodiment, a sufficient amount of air can be supplied to the exhaust path 16 without using a separate device arranged to forcibly supply the air into the exhaust path 16, such as an air pump or the like. Even when a pump arranged to supply air is used, the load applied on the pump can be small and so the loss of the internal combustion engine output can be small.

The temperature of the air to be supplied to the exhaust path 16 is roughly equal to the temperature of the outside air, and is significantly lower than that of the exhaust gas. Therefore, in the present preferred embodiment, the temperature of the exhaust gas can be further decreased by the air having a low temperature, which is supplied into the exhaust path 16 in a large amount. Also in the present preferred embodiment, a large amount of air can be supplied upstream with respect to the first catalyst 17. Therefore, even where the amount of fuel to be injected is increased in order to make the air/fuel ratio of the internal combustion engine 1 smaller than the theoretical air/fuel ratio, exhaust gas containing an equivalent amount of oxygen to where the air/fuel ratio is the theoretical air/fuel ratio can be supplied to the first catalyst 17. Therefore, in the present preferred embodiment, the temperature of the exhaust gas can also be decreased by making the air/fuel ratio of the internal combustion engine 1 smaller than the theoretical air/fuel ratio and thus decreasing the combustion temperature. In addition, since the air/fuel ratio is smaller than the theoretical air/fuel ratio, it is possible to cool the elements in the vicinity of the combustion chamber 10 (intake valve 8, exhaust valve 9, valve seat, piston, etc.) with the extra fuel. Thus, the reliability of the internal combustion engine 1 can be improved.

Preferred Embodiment 3

Figure 16:
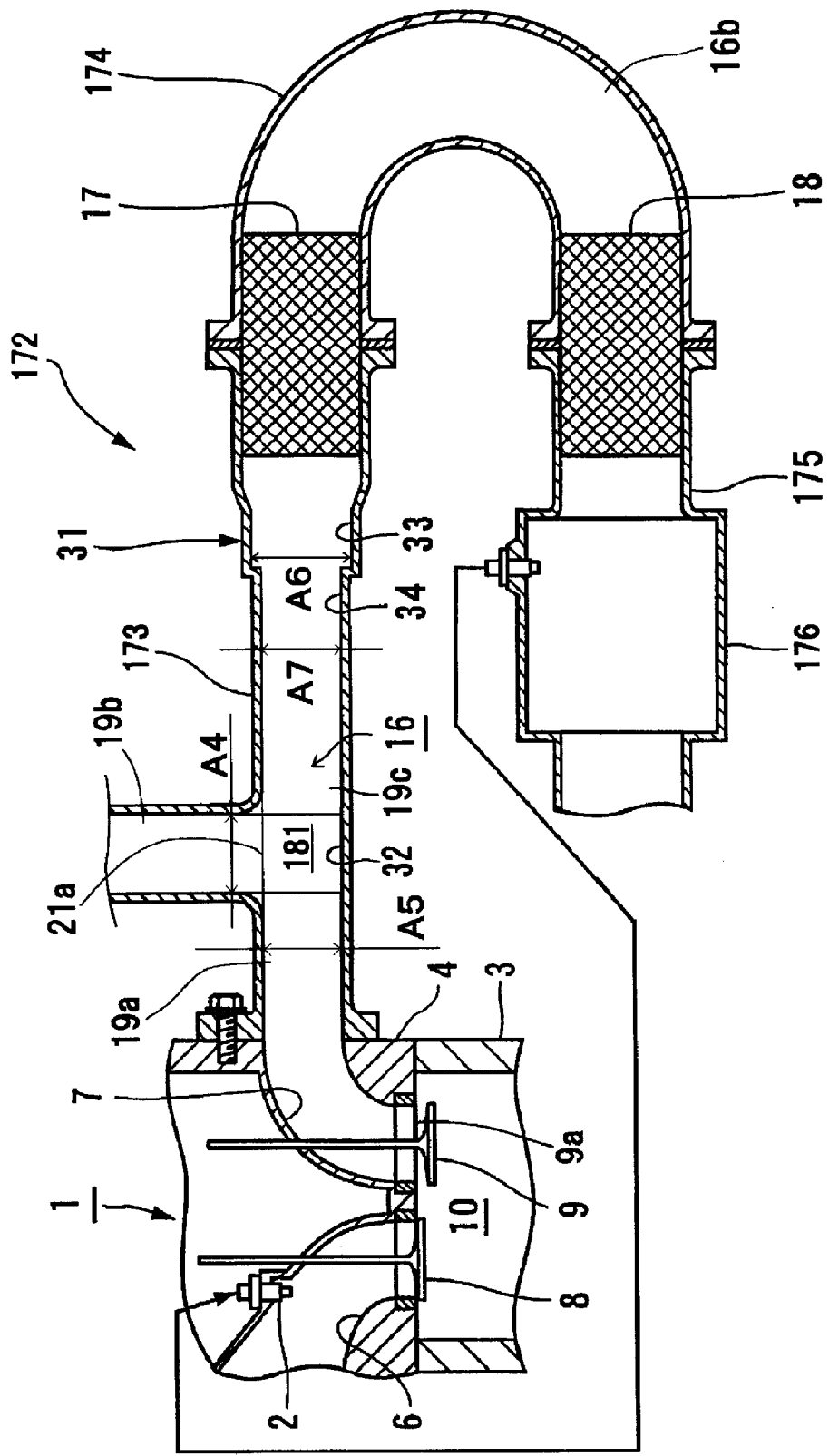
FIG. 16 is a schematic view showing a structure of an internal combustion engine according to Preferred Embodiment 3.

In the present preferred embodiment, the convergent section is preferably different from that of Preferred Embodiment 1 or 2. Except for this structural difference, Preferred Embodiment 3 is preferably the same as Preferred Embodiment 1. Accordingly, the detailed description of Preferred Embodiment 3 is provided by the detailed description of FIG. 1 through FIG. 13B relating to Preferred Embodiment 1. As shown in FIG. 16, in the present preferred embodiment, the convergent section is preferably defined by the first merging upstream section 19a, the second merging upstream section 19b and the merging downstream sections 19c. FIG. 16 shows only one of a plurality of merging downstream sections 19c of the exhaust path 16. The flow path cross-sectional area of the first merging upstream section 19a is A5, the flow path cross-sectional area of the second merging upstream section 19b is A4, and the flow path cross-sectional area of the merging downstream section 19c is A7. When flow path cross-sectional area A5 of the first merging upstream section 19a, flow path cross-sectional area A4 of the second merging upstream section 19b, and flow path cross-sectional area A7 of the merging downstream section 19c are substantially the same as one another, A5, A9 and A7 have the following relationship. A sum of flow path cross-sectional area A5 of the first merging upstream section 19a and flow path cross-sectional area A4 of the second merging upstream section 19b is larger than flow path cross-sectional area A7 of the merging downstream section 19c (A4+A5>A7). Accordingly, by merging together the first merging upstream section 19a and the second merging upstream section 19b each having substantially the same pipe diameter, a convergent section including a smaller flow path cross-sectional area at a downstream end thereof than at an upstream end thereof can be provided downstream with respect to the connection section 181. Therefore, merely by providing the divergent section 33 downstream with respect to the connection section 181, the convergent-divergent nozzle 31 can be substantially provided. A portion between the connection section 181 and the divergent section 33 is the throat section 34. The throat section 34 may be lengthy along the flow direction as shown here. The flow path cross-sectional area of the divergent section 33 is not limited to be smoothly increasing in the downstream direction, and may increase step by step. The flow path cross-sectional area of the convergent section may decrease step by step.

In Preferred Embodiments 1 through 3, the internal combustion engine 1 puts the exhaust gas into a low pressure and low temperature state as follows. The fuel is combusted in the combustion chamber 10. The exhaust valve 9 arranged to open or close the exhaust port 9a of the combustion chamber 10 of #A cylinder is opened to discharge the exhaust gas 36 to the first merging upstream section 19a from the combustion chamber 10. The shock wave 35 propagating in the first merging upstream section 19a at a higher velocity than the exhaust gas 36 is generated. At least a portion of the shock wave 35 is branched from the first merging upstream section 19a, and the branched shock wave 35 is propagated in the second merging upstream section 19b to reflect the shock wave 35 by the exhaust valve 9 of #B cylinder. The reflected shock wave 35 is propagated oppositely in the second merging upstream section 19b and caused to collide against the exhaust gas, thereby increasing the pressure of the exhaust gas. The flow path cross-sectional area of the exhaust path 16 is decreased to increase the pressure of the exhaust gas 36. Specifically, the pressure of the exhaust gas is increased by causing the exhaust gas to flow in a portion of the exhaust path 16 in which the flow path cross-sectional area is decreased in the downstream direction. In addition, the velocity of the exhaust gas 36 is increased by increasing the flow path cross-sectional area of the exhaust path 16. Specifically, the velocity of the exhaust gas is increased by causing the exhaust gas to flow in a portion of the exhaust path 16 in which the flow path cross-sectional area is increased in the downstream direction. The new shock wave 35b propagating in the downstream direction in the exhaust path 16 is generated to define a region of a negative pressure in the exhaust path 16. Thus, the exhaust gas is put into a low pressure and low temperature state by an adiabatic cooling effect caused by adiabatic expansion. Therefore, the exhaust gas can be put into a low pressure and low temperature state even when the internal combustion engine 1 is driven in a high load state or at a high velocity.

Figure 17A:
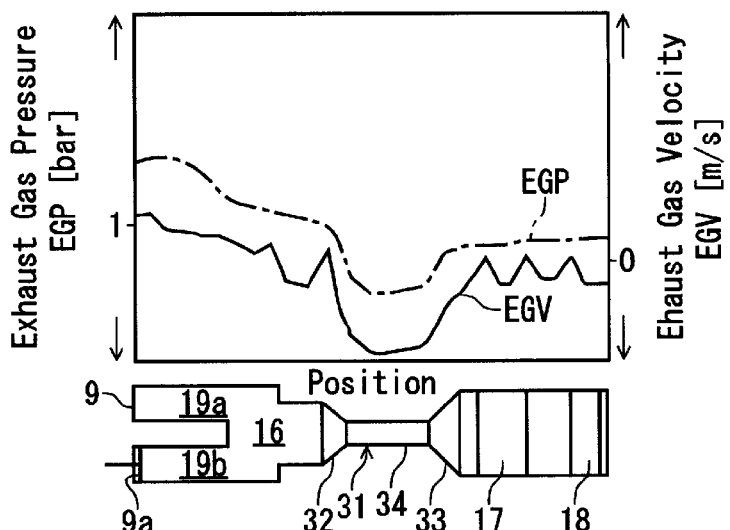
FIGS. 17A-17D show the relationship between the exhaust gas velocity and the exhaust gas pressure in the exhaust path in time sequence.
Figure 17B:
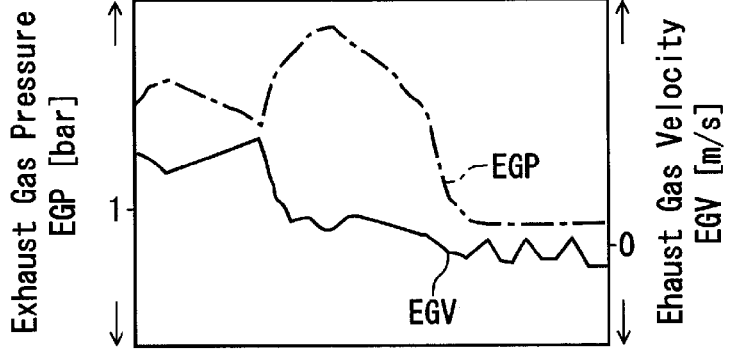
Figure 17C:
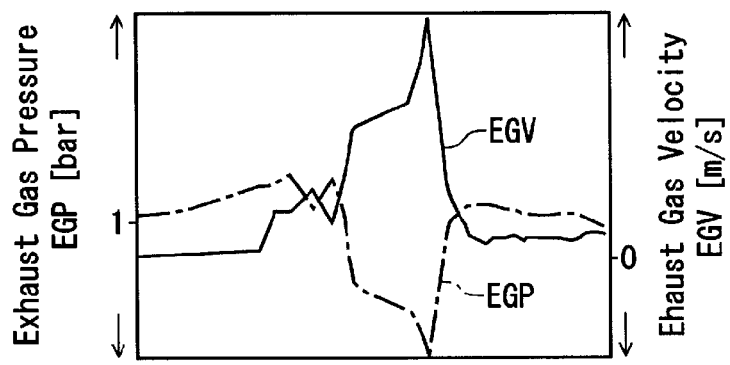
Figure 17D:
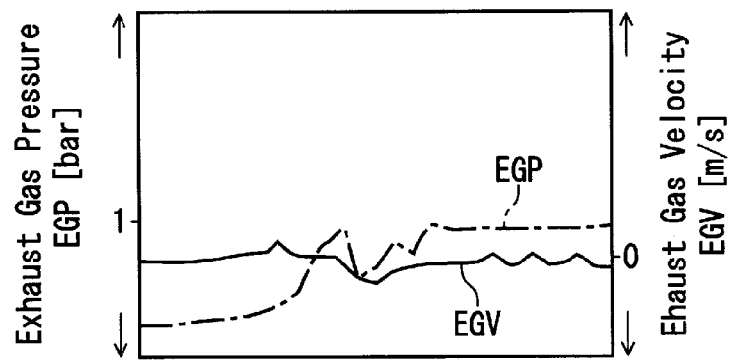
Figure 18A:
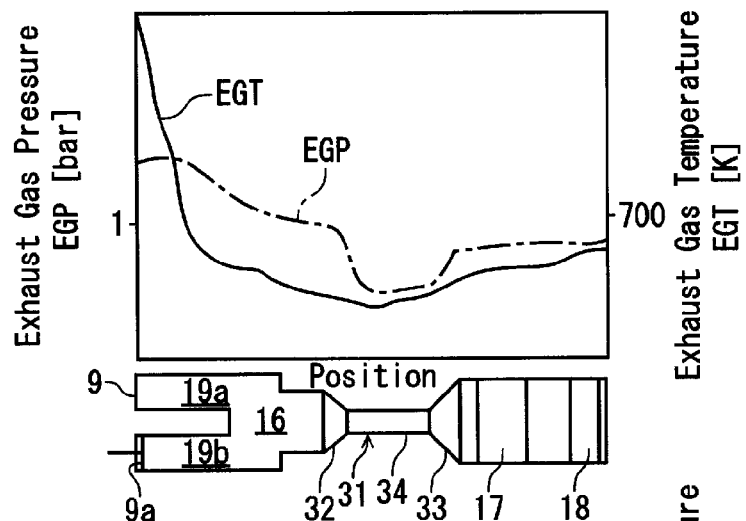
FIGS. 18A-18D show the relationship between the exhaust gas pressure and the exhaust gas temperature in the exhaust path in time sequence.
Figure 18B:
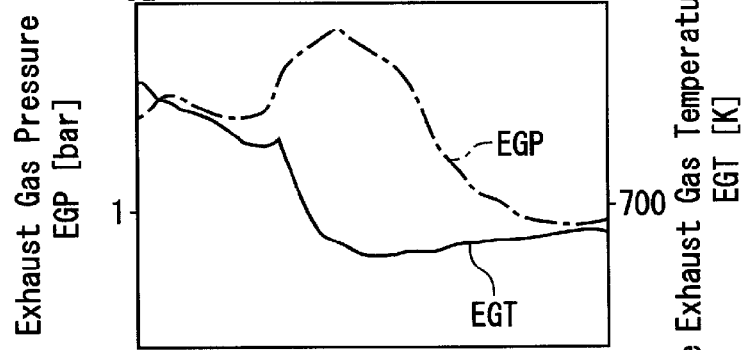
Figure 18C:
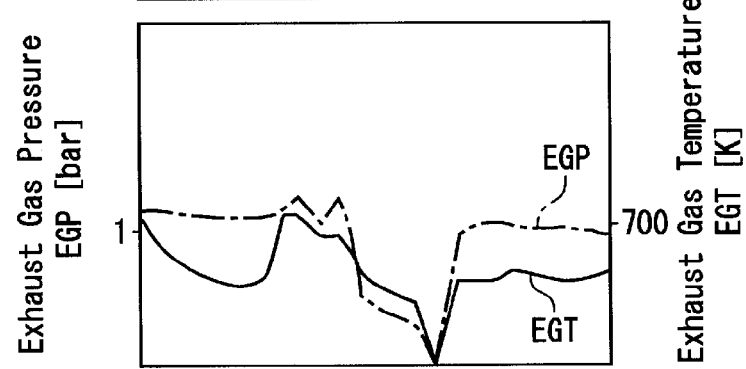
Figure 18D:
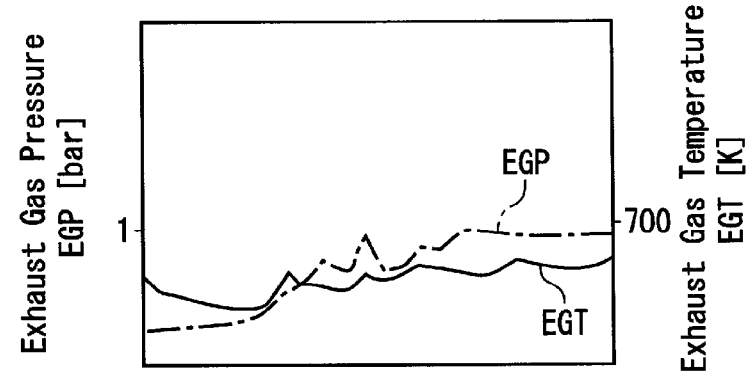

With reference to FIGS. 17A-17D and FIGS. 18A-18D, the above-described exhausting method for the internal combustion engine will be described in more detail. FIGS. 17A-17D show the relationship between the exhaust gas velocity and the exhaust gas pressure in the exhaust path 16 in time sequence. FIGS. 18A-18D show the relationship between the exhaust gas pressure and the exhaust gas temperature in the exhaust path 16 in time sequence. The waveforms shown in FIG. 10 represent the relationship between the exhaust gas velocity and the exhaust gas pressure when the shock wave is being accelerated as shown in FIG. 17C. FIG. 17A and FIG. 18A show the respective relationship immediately after the exhaust port 9a is opened. FIG. 17B and FIG. 18B show the respective relationship immediately after the exhaust gas and the shock wave collide against each other downstream with respect to the connection section 181. FIG. 17O and FIG. 18C show the respective relationship when the shock wave is being accelerated in the divergent section 33. FIG. 17D and FIG. 18D show the respective relationship after the shock wave is accelerated.

The exhausting method for the multi-cylinder internal combustion engine in the present preferred embodiment is preferably as follows.

1) The fuel is combusted in the combustion chamber of #A cylinder. By opening the exhaust port 9a in the combustion chamber, the exhaust gas is discharged into the first merging upstream section 19a from the combustion chamber, and also the shock wave propagating in the first merging upstream section 19a at a higher velocity than the exhaust gas is generated. FIG. 17A shows the exhaust gas velocity and the exhaust gas pressure immediately after the exhaust port 9a is opened. As shown in FIG. 17A, when the exhaust port 9a is opened, the pressure of the exhaust gas in the vicinity of the exhaust port 9a becomes higher than the atmospheric pressure. FIG. 18A shows the exhaust gas pressure and the exhaust gas temperature immediately after the exhaust port 9a is opened. As shown in FIG. 18A, the temperature of the exhaust gas becomes very high by receiving the combustion heat.

2) The second merging upstream section 19b branches at least a portion of the shock wave propagating in the first merging upstream section 19a. The exhaust port 9a of #B cylinder reflects the branched shock wave. The reflected shock wave propagates in the second merging upstream section 19b oppositely to the connection section 181. The reflected shock wave collides against the exhaust gas flowing in the connection section 181 or the merging downstream section 19c, which increases the pressure of the exhaust gas. The flow path cross-sectional area of the exhaust path 16 is decreased in the convergent section 32, which increases the pressure of the exhaust gas. Either the increase of the exhaust gas pressure caused by the collision of the shock wave and the exhaust gas, or the increase of the exhaust gas pressure caused by the decrease of the flow path cross-sectional area, may occur first. Specifically, the collision of the shock wave and the exhaust gas may occur before or after the exhaust gas pressure is increased in the convergent section 32. FIG. 17B shows the exhaust gas velocity and the exhaust gas pressure immediately after the exhaust gas pressure is increased. As shown in FIG. 17B, in the vicinity of the convergent section 32, the exhaust gas pressure is higher than that at the time of FIG. 17A. Upstream with respect to the convergent section 32, the exhaust gas velocity is higher than that at the time of FIG. 17A. FIG. 18B shows the exhaust gas pressure and the exhaust gas temperature immediately after the exhaust gas pressure is increased. As shown in FIG. 18B, the exhaust gas temperature is lower in the vicinity of the exhaust port 9a, but is higher upstream with respect to the convergent section 32, than that at the time of FIG. 18A.

3) The flow path cross-sectional area of the exhaust path 16 is increased in the divergent section 33 to decrease the exhaust gas pressure. When the exhaust gas pressure is decreased to be equal to or lower than the critical pressure ratio, a new shock wave propagating in the downstream direction in the exhaust path 16 is generated. When the shock wave is generated, an expansion wave progressing in the upstream direction is generated at the same time. The new shock wave is accelerated in the divergent section 33. Therefore, the fluid present in the space between the shock wave progressing in the downstream direction in the exhaust path 16 and the expansion wave progressing in the upstream direction in the exhaust path 16 expands rapidly. This can decrease the pressure of the exhaust gas flowing in the exhaust path 16. Thus, a region of a negative pressure can be generated in the exhaust path. At this point, the exhaust gas temperature can be decreased upstream with respect to the shock wave by an adiabatic cooling effect caused by adiabatic expansion. FIG. 17C shows the exhaust gas velocity and the exhaust gas pressure when the shock wave is being accelerated in the divergent section. As shown in FIG. 17C, the exhaust gas pressure is rapidly decreased from that at the time of FIG. 17B upstream with respect to the divergent section 33, to become a negative pressure. In accompaniment with this, the exhaust gas velocity upstream with respect to the divergent section 33 is rapidly increased. FIG. 18C shows the exhaust gas pressure and the exhaust gas temperature when the shock wave is being accelerated in the divergent section 33. As shown in FIG. 18C, in accompaniment with the decrease of the exhaust gas pressure upstream with respect to the divergent section 33, the exhaust gas temperature is rapidly decreased from that at the time of FIG. 18B.

FIG. 17D shows the exhaust gas velocity and the exhaust gas pressure after the shock wave is accelerated. As shown in FIG. 17D, the influence of the exhaust gas pressure, which is decreased upstream with respect to the divergent section 33 at the time of FIG. 17C, is exerted even on the exhaust port 9a upstream with respect to the convergent section 32. Therefore, the exhaust gas pressure becomes a negative pressure also in the vicinity of the exhaust port 9a. FIG. 18D shows the exhaust gas pressure and the exhaust gas temperature after the shock wave is accelerated. As shown in FIG. 18D, since the exhaust gas pressure becomes a negative pressure also in the vicinity of the exhaust port 9a, the exhaust gas temperature can also be significantly decreased in the vicinity of the exhaust port. This can also cool the exhaust valve 9 and prevent the deterioration thereof.

As shown in FIGS. 18A-18D, the exhaust gas temperature downstream with respect to the divergent section 33 does not change much. In other words, since the exhaust gas of a high temperature in the vicinity of the exhaust port 9a shown in FIG. 18A is cooled by an adiabatic cooling effect in the divergent section 33, the exhaust gas temperature downstream with respect to the divergent section 33 can be prevented from being changed.

In the example shown in FIGS. 17A-17D and FIGS. 18A-18D, the first catalyst 17 and the second catalyst 18 are provided downstream with respect to the divergent section 33. Since the exhaust gas temperature downstream with respect to the divergent section 33 can be prevented from being changed as described above, the temperature of the exhaust gas passing the first catalyst 17 and the second catalyst can be prevented from becoming excessively high. This can prevent sintering of the catalysts even where the internal combustion engine 1 is driven at a high load or in a high rotational speed range.

Where a secondary air supply path arranged to supply secondary air to a region in which a negative pressure is generated is connected, the secondary air can be supplied to the exhaust path 16. Specifically, as shown in FIG. 17C and FIG. 17D, after the shock wave 35b is accelerated, a negative pressure region is generated upstream with respect to the divergent section 33. Therefore, by connecting the secondary air supply path upstream with respect to the divergent section 33, secondary air can be supplied to the exhaust path 16.

Other Preferred Embodiments

Figure 19:
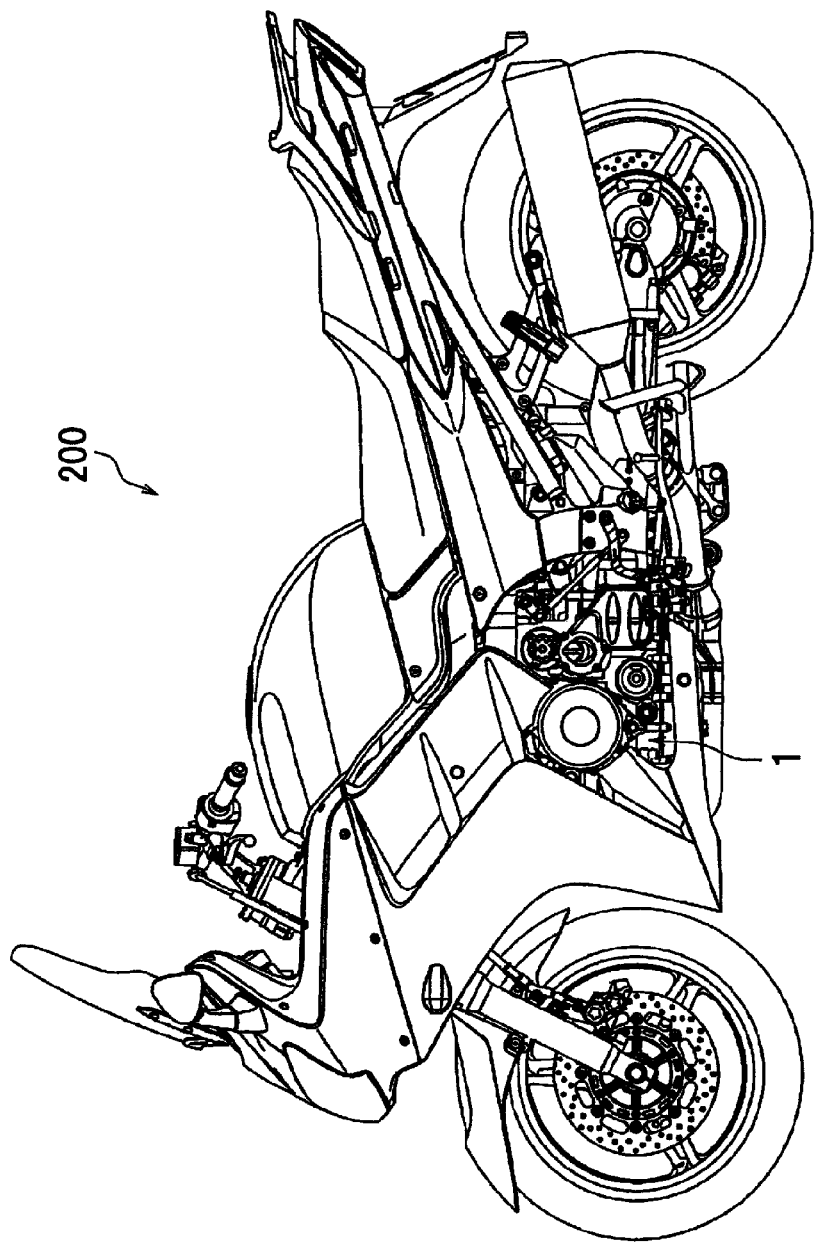
FIG. 19 shows a motorcycle including an internal combustion engine according to a preferred embodiment of the present invention mounted thereon.

There is no limitation on the applications of the internal combustion engine according to preferred embodiments of the present invention. The internal combustion engine according to a preferred embodiment of the present invention is applied for, for example, a vehicle such as a motorcycle. FIG. 19 shows an example in which the internal combustion engine 1 according to a preferred embodiment of the present invention is applied to a motorcycle 200.

In each of the above preferred embodiments, the internal combustion engine 1 preferably includes two convergent-divergent nozzles 31 downstream with respect to one connection section 181. The shape of the internal combustion engine 1 according to a preferred embodiment of the present invention is not limited to this. For example, one convergent-divergent nozzle 31 or three or more convergent-divergent nozzles 31 may be provided for one connection section 181, for example.

In each of the above preferred embodiments, the internal combustion engine 1 is preferably an inline engine. The shape of the internal combustion engine 1 according to a preferred embodiment of the present invention is not limited to this. For example, the internal combustion engine 1 may be a V-type engine, a horizontally opposed engine or a radial engine, for example.

Figure 20A:
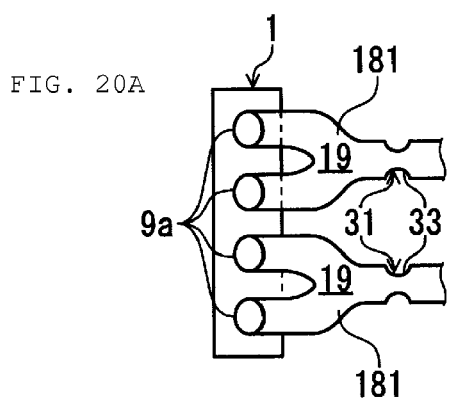
FIGS. 20A-20F are schematic views of an exhaust device according to other preferred embodiments of the present invention.
Figure 20B:
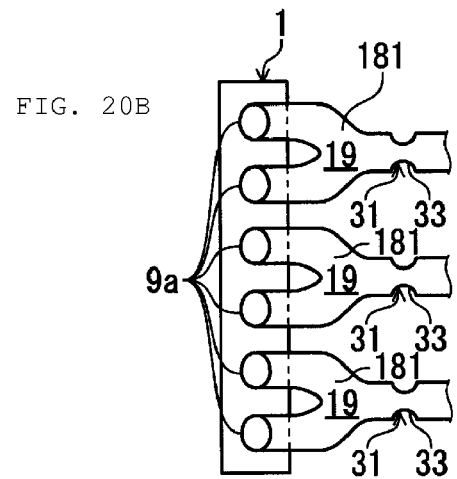
Figure 20C:
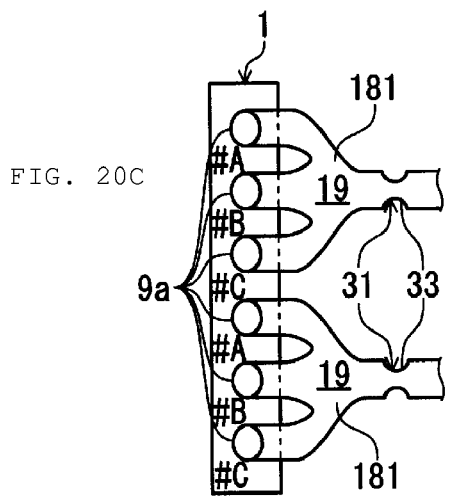
Figure 20D:
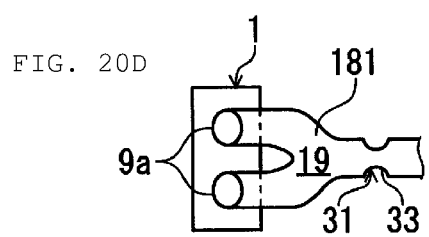
Figure 20E:
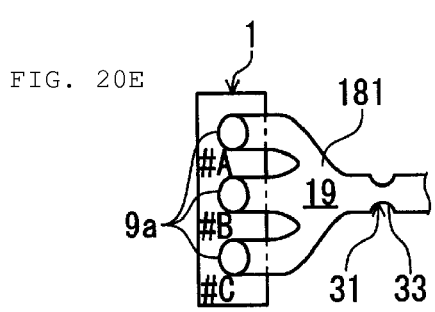
Figure 20F:
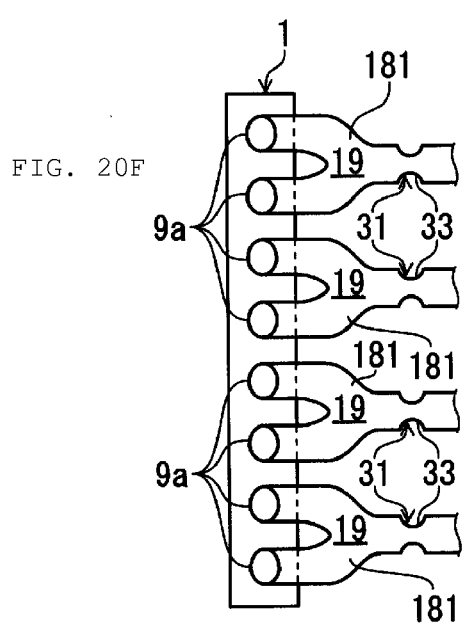

In each of the above preferred embodiments, as shown in FIG. 20A, the internal combustion engine 1 preferably includes four cylinders and two exhaust merging sections 19. Each exhaust merging section 19 connects exhaust ports 9a provided in two combustion chambers upstream with respect to the divergent section 33. For the internal combustion engine 1 according to a preferred embodiment of the present invention, it is sufficient that only the exhaust ports 9a of the combustion chambers, the opening periods of which do not overlap, are connected upstream with respect to the divergent section 33. For example, as shown in FIG. 20B, the internal combustion engine 1 according to a preferred embodiment of the present invention may include six cylinders and three exhaust merging sections 19, and each exhaust merging section 19 may connect exhaust ports 9a provided in two combustion chambers 10 upstream with respect to the divergent section 33. Alternatively, as shown in FIG. 20C, the internal combustion engine 1 according to a preferred embodiment of the present invention may include six cylinders and two exhaust merging sections 19, and each exhaust merging section 19 may connect exhaust ports 9a provided in three combustion chambers 10 upstream with respect to the divergent section 33. Still alternatively, as shown in FIG. 20D, the internal combustion engine 1 according to a preferred embodiment of the present invention may include two cylinders and one exhaust merging section 19, and the exhaust merging section 19 may connect exhaust ports 9a provided in two combustion chambers 10 upstream with respect to the divergent section 33. Still alternatively, as shown in FIG. 20E, the internal combustion engine 1 according to a preferred embodiment of the present invention may include three cylinders and one exhaust merging section 19, and the exhaust merging section 19 may connect exhaust ports 9a provided in three combustion chambers 10 upstream with respect to the divergent section 33. Still alternatively, as shown in FIG. 20F, the internal combustion engine 1 according to a preferred embodiment of the present invention may include eight cylinders and four exhaust merging section 19, and each exhaust merging section 19 may connect exhaust ports 9a provided in two combustion chambers 10 upstream with respect to the divergent section 33.

In the specific examples shown in FIG. 20A, FIG. 20B, FIG. 20D and FIG. 20F, each exhaust merging section 19 connects the exhaust ports 9a provided in two combustion chambers upstream with respect to the divergent section 33. Therefore, the same effects as those of Preferred Embodiment 1 are provided where substantially the same conditions as those of Preferred Embodiment 1 are fulfilled.

In the specific examples shown in FIG. 20C and FIG. 20E, each exhaust merging section 19 connects the exhaust ports 9a provided in three combustion chambers upstream with respect to the divergent section 33. Therefore, only the exhaust ports of the combustion chambers, the opening periods of which do not overlap, need to be connected upstream with respect to the divergent section 33. In addition, the following expressions (9) through (20) need to be fulfilled.

$$Le1/Ve \leq (Le1+2Le2)/Vs \tag{9}$$

$$Le1/Ve \leq (Le1+2Le3)/Vs \tag{10}$$

$$Le2/Ve \leq (Le2+2Le1)/Vs \tag{11}$$

$$Le2/Ve \leq (Le2+2Le3)/Vs \tag{12}$$

$$Le3/Ve \leq (Le3+2Le1)/Vs \tag{13}$$

$$Le3/Ve \leq (Le3+2Le2)/Vs \tag{14}$$

$$(Le1+2Le2+Ld)/Vs \leq tv+(Le1+Ld)/Ve \tag{15}$$

$$(Le1+2Le3+Ld)/Vs \leq tv+(Le1+Ld)/Ve \tag{16}$$

$$(Le2+2Le1+Ld)/Vs \leq tv+(Le2+Ld)/Ve \tag{17}$$

$$(Le2+2Le3+Ld)/Vs \leq tv+(Le2+Ld)/Ve \tag{18}$$

$$(Le3+2Le1+Ld)/Vs \leq tv+(Le3+Ld)/Ve \quad (19)$$

$$(Le3+2Le2+Ld)/Vs \leq tv+(Le3+Ld)/Ve \quad (20)$$

In the above expressions, Le1, Le2 and Le3 are respectively the distance between the exhaust port 9a of #A cylinder and the connection section 181, the distance between the exhaust port 9a of #B cylinder and the connection section 181, and the distance between the exhaust port 9a of #C cylinder and the connection section 181 in FIG. 20C and FIG. 20E. Ld is the distance from the connection section 181 to the upstream end of the divergent section 33, tv is the time from when the exhaust port 9a is opened until the exhaust port 9a is closed, Ve is the velocity of the exhaust gas 36, and Vs is the propagation velocity of the shock wave 35.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A multi-cylinder internal combustion engine comprising:
   a plurality of combustion chambers including a plurality of exhaust ports, each of the plurality of combustion chambers including at least one of the plurality of exhaust ports;
   a plurality of exhaust valves each arranged to open or close a respective one of the plurality of exhaust ports, each of the plurality of exhaust ports including an opening period in which the respective exhaust port is open; and
   an exhaust path arranged to guide exhaust gas discharged from each of the combustion chambers via the exhaust port; wherein
   the exhaust path includes:
      a convergent section including a flow path cross-sectional area that is smaller at a downstream end thereof than at an upstream end thereof;
      a divergent section provided downstream with respect to the convergent section and including a flow path cross-sectional area that is larger at a downstream end thereof than at an upstream end thereof; and
      an exhaust merging section provided upstream with respect to the divergent section and arranged to connect the plurality of combustion chambers, and only the exhaust ports of different combustion chambers that include opening periods of that do not overlap are connected to each other upstream of the divergent section;
   the exhaust merging section is arranged such that a shock wave, propagating in the exhaust merging section at a higher velocity than the exhaust gas flowing into the exhaust merging section when one of the plurality of exhaust ports connected by the exhaust merging section is opened, is reflected by the exhaust valve closing another one of the plurality of exhaust ports;
   the exhaust gas flowing into the exhaust path from the combustion chamber is caused to pass the convergent section and to collide against the reflected shock wave, between an upstream end of the exhaust merging section and the divergent section, so as to increase the pressure of the exhaust gas in the convergent section; and
   the exhaust gas is caused to pass the divergent section to generate a new shock wave and thus to generate a negative pressure in a portion of the exhaust path which is upstream with respect to the divergent section by the generated new shock wave.

2. A multi-cylinder internal combustion engine comprising:
   a first combustion chamber including a first exhaust port;
   a second combustion chamber including a second exhaust port;
   a first exhaust valve arranged to open or close the first exhaust port, the first exhaust port including a period in which the first exhaust port is open;
   a second exhaust valve arranged to open or close the second exhaust port, the second exhaust port including a period in which the second exhaust port is open; and
   an exhaust path arranged to guide exhaust gas discharged from each of the combustion chambers via the corresponding exhaust port; wherein
   the period in which the first exhaust port is opened and the period in which the second exhaust port is opened do not overlap;
   the exhaust path includes:
      a convergent section including a flow path cross-sectional area that is smaller at a downstream end thereof than at an upstream end thereof;
      a divergent section provided downstream with respect to the convergent section and including a flow path cross-sectional area that is larger at a downstream end thereof than at an upstream end thereof; and
      a connection section provided upstream with respect to the divergent section and arranged to connect a first merging upstream section arranged to guide the exhaust gas discharged from the first exhaust port and a second merging upstream section arranged to guide the exhaust gas discharged from the second exhaust port, and only exhaust ports of different combustion chambers that include opening periods that do not overlap are connected to each other upstream of the divergent section;
   where a velocity of the exhaust gas flowing into the exhaust path when each of the exhaust ports is opened is Ve and a propagation velocity of the shock wave propagating in the exhaust path is Vs, a distance Le1 between the first exhaust port and the connection section and a distance Le2 between the second exhaust port and the connection section fulfill relationships of:

$$Le1/Ve \leq (Le1+2Le2)/Vs, \text{ and}$$

$$Le2/Ve \leq (Le2+2Le1)/Vs, \text{ and}$$

where a time from when each of the exhaust ports is opened until the each of the exhaust ports is closed is tv, a distance Ld between the connection section and the upstream end of the divergent section fulfills the relationships of:

$$(Le1+2Le2+Ld)/Vs \leq tv+(Le1+Ld)/Ve, \text{ and}$$

$$(Le2+2Le1+Ld)/Vs \leq tv+(Le2+Ld)/Ve.$$

3. The multi-cylinder internal combustion engine according to claim 2, further comprising:
   a third combustion chamber including a third exhaust port; and
   a third exhaust valve arranged to open or close the third exhaust port, the third exhaust port including a period in which the third exhaust port is open; wherein
   a third merging upstream section arranged to guide the exhaust gas discharged from the third exhaust port is connected to the connection section;

the period in which the third exhaust port is opened does not overlap the period in which the first exhaust port is opened or the period in which the second exhaust port is opened; and a distance Le3 between the third exhaust port and the connection section fulfills relationships of:

$Le1/Ve \leq (Le1+2Le3)/Vs,$ $Le2/Ve \leq (Le2+2Le3)/Vs,$ $Le3/Ve \leq (Le3+2Le1)/Vs,$ $Le3/Ve \leq (Le3+2Le2)/Vs,$ $(Le1+2Le3+Ld)/Vs \leq tv+(Le1+Ld)/Ve,$ $(Le2+2Le3+Ld)/Vs \leq tv+(Le2+Ld)/Ve,$ $(Le3+2Le1+Ld)/Vs \leq tv+(Le3+Ld)/Ve,$ and $(Le3+2Le2+Ld)/Vs \leq tv+(Le3+Ld)/Ve.$ 4. An exhausting method for a multi-cylinder internal combustion engine, the method comprising the steps of:

combusting fuel in a combustion chamber;

opening an exhaust valve arranged to open or close an exhaust port of the combustion chamber to discharge exhaust gas from the combustion chamber to an exhaust path and to generate a shock wave propagating in the exhaust path at a higher velocity than the exhaust gas, the exhaust port including an opening period in which the exhaust port is open;

reflecting at least a portion of the shock wave by an exhaust valve closing an exhaust port and causing the reflected shock wave to collide against the exhaust gas, thereby increasing the pressure of the exhaust gas;

causing the exhaust gas to flow into a portion of the exhaust path having a smaller flow path cross-sectional area in a downstream section thereof than in an upstream section thereof, thereby increasing the pressure of the exhaust gas; and causing the exhaust gas to flow into a portion of the exhaust path having a larger flow path cross-sectional area in a downstream section thereof than in an upstream section thereof, thereby generating a new shock wave propagating in a downstream direction in the exhaust path to generate a region of a negative pressure in the exhaust path; wherein only exhaust ports of different combustion chambers that include opening periods that do not overlap are connected to each other upstream of the larger flow path cross-sectional area.

5. The multi-cylinder internal combustion engine according to claim 1, comprising:

four of the combustion chambers; and two of the exhaust merging sections; wherein each of the exhaust merging sections connects the exhaust ports provided in two of the combustion chambers.

6. The multi-cylinder internal combustion engine according to claim 1, comprising:

six of the combustion chambers; and two of the exhaust merging sections; wherein each of the exhaust merging sections connects the exhaust ports provided in three of the combustion chambers.

7. The multi-cylinder internal combustion engine according to claim 1, comprising:

six of the combustion chambers; and three of the exhaust merging sections; wherein each of the exhaust merging sections connects the exhaust ports provided in two of the combustion chambers.

8. The multi-cylinder internal combustion engine according to claim 1, comprising:

two of the combustion chambers; and one of the exhaust merging sections; wherein each of the exhaust merging sections connects the exhaust ports provided in two of the combustion chambers.

9. The multi-cylinder internal combustion engine according to claim 1, comprising:

three of the combustion chambers; and one of the exhaust merging sections; wherein each of the exhaust merging sections connects the exhaust ports provided in three of the combustion chambers.

10. The multi-cylinder internal combustion engine according to claim 1, comprising:

eight of the combustion chambers; and four of the exhaust merging sections; wherein each of the exhaust merging sections connects the exhaust ports provided in two of the combustion chambers.

11. A vehicle comprising the internal combustion engine according to claim 1.

12. A marine vessel comprising the internal combustion engine according to claim 1.

13. A vehicle comprising the internal combustion engine according to claim 2.

14. A marine vessel comprising the internal combustion engine according to claim 2.

* * * * *